(12) United States Patent
Palle Venkata et al.

(10) Patent No.: US 12,720,415 B2
(45) Date of Patent: Aug. 25, 2026

(54) TIME-DOMAIN OFFSET FOR NON-CELL DEFINING SYNCHRONIZATION SIGNAL BLOCK

(71) Applicant: Apple Inc., Cupertino, CA (US)

(72) Inventors: Naveen Kumar R. Palle Venkata, San Diego, CA (US); Dawei Zhang, Saratoga, CA (US); Haijing Hu, Los Gatos, CA (US); Hong He, San Jose, CA (US); Jie Cui, San Jose, CA (US)

(73) Assignee: Apple Inc., Cupertino, CA (US)

( * ) Notice: Subject to any disclaimer, the term of this patent is extended or adjusted under 35 U.S.C. 154(b) by 481 days.

(21) Appl. No.: 18/365,952

(22) Filed: Aug. 4, 2023

(65) Prior Publication Data

US 2024/0049114 A1 Feb. 8, 2024

Related U.S. Application Data

(63) Continuation of application No. PCT/US2022/049454, filed on Nov. 9, 2022.

(60) Provisional application No. 63/395,661, filed on Aug. 5, 2022.

(51) Int. Cl.
*H04W 48/08* (2009.01)
*H04L 5/00* (2006.01)

(52) U.S. Cl.
CPC ........... *H04W 48/08* (2013.01); *H04L 5/0048* (2013.01)

(58) Field of Classification Search
CPC ... H04W 48/08; H04W 56/0015; H04W 8/22; H04L 5/0048; H04L 5/0078; H04L 5/0094; H04L 5/001
USPC ....................... 455/422.1, 403; 370/328, 336
See application file for complete search history.

(56) References Cited

U.S. PATENT DOCUMENTS

2023/0140232 A1* 5/2023 Zhang .................. H04W 56/00 370/503
2023/0224880 A1* 7/2023 Xiong .................. H04L 5/0044 370/329
2023/0276484 A1* 8/2023 Lei ...................... H04W 72/542 370/329
2023/0379848 A1* 11/2023 Lei .................... H04W 56/0015

OTHER PUBLICATIONS

International Patent Application No. PCT/US2022/049454, International Preliminary Report on Patentability, Feb. 20, 2025, 10 pages.
"Discussion on NCD-SSB Offset", 3GPP TSG RAN WG1 #109-e, R1-2203590, May 9-20, 2022, 3 pages.
"On Timing Offset Between CD-SSB and NCD-SSB for RedCap", 3GPP TSG•RAN WG4 Meeting #103-e, R4-2209704, May 9-20, 2022, 3 pages.
"Reply LS on Introduction of an Offset to Transmit CD-SSB and NCD-SSB at Different Times", 3GPP TSG RAN WG1 #110, R1-2205734, Aug. 22-26, 2022, 1 page.
PCT/US2022/049454, "International Search Report and Written Opinion", Apr. 24, 2023, 13 pages.

* cited by examiner

*Primary Examiner* — Juan A Torres
(74) *Attorney, Agent, or Firm* — Kilpatrick Townsend & Stockton LLP

(57) ABSTRACT

The present application relates to devices and components including apparatus, systems, and methods to configure time-domain offset for non-cell defining synchronization signal blocks.

20 Claims, 12 Drawing Sheets

200

202

```
SSB-MTC ::= SEQUENCE {
    periodicityAndOffset CHOICE {
204     sf5 INTEGER (0..4),
206     sf10 INTEGER (0..9),
208     sf20 INTEGER (0..19),
210     sf40 INTEGER (0..39),
212     sf80 INTEGER (0..79),
214     sf160 INTEGER (0..159),
    }
    duration        ENUMERATE {sf1, sf2, sf3, sf4, sf5}
}
```

```
NonCellDefiningSSB-r17 ::= SEQUENCE {
  absoluteFrequencySSB-r17 ARFCN-ValueNR,
302 ssb-Periodicity-r17   ENUMERATED{ms5, ms10, ms20, ms40, ms80,
                          ms160, spare2, spare1} OPTIONAL,    -- Need S
304 ssb-TimeOffset-r17    ENUMERATED{sf5, sf10, sf15, spare5, spare4,
                          spare3, spare2, spare1} OPTIONAL,    -- Need S
  ...
}
```

FIG. 3

```
UE-NR-Capability-v1700 ::= SEQUENCE{
 inactiveStatePO-Determination-r17  ENUMERATED {supported} OPTIONAL,
 highSpeedParameters-v1700  HighSpeedParameters-v1700 OPTIONAL,
 powSav-Parameters-v1700  PowSav-Parameters-v1700 OPTIONAL,
 mac-Parameters-v1700  MAC-Parameters-v1700  OPTIONAL,
 ims-Parameters-v1700  IMS-Parameters-v1700 OPTIONAL,
   measAndMobParameters-v1700  MeasAndMobParameters-v1700
 appLayerMeasParameters-r17  AppLayerMeasParameters-r17 OPTIONAL,
 redCapParameters-r17  RedCapParameters-r17 OPTIONAL,
 ra-SDT-r17  ENUMERATED {supported} OPTIONAL,
 srb-SDT-r17  ENUMERATED {supported} OPTIONAL,
 gNB-SideRTT-BasedPDC-r17  ENUMERATED {supported} OPTIONAL,
 bh-RLF-DetectionRecovery-Indication-r17 ENUMERATED {supported} OPTIONAL,
 nrdc-Parameters-v1700  NRDC-Parameters-v1700 OPTIONAL,
 bap-Parameters-v1700  BAP-Parameters-v1700 OPTIONAL,
 musim-GapPreference-r17  ENUMERATED {supported} OPTIONAL,
 musimLeaveConnected-r17  ENUMERATED {supported} OPTIONAL,
   mbs-Parameters-r17  MBS-Parameters-r17,
 nonTerrestrialNetwork-r17  ENUMERATED {supported} OPTIONAL,
 ntn-ScenarioSupport-r17  ENUMERATED {gso, ngso} OPTIONAL,
 sliceInfoforCellReselection-r17  ENUMERATED {supported} OPTIONAL,
 ue-RadioPagingInfo-r17  UE-RadioPagingInfo-r17 OPTIONAL,
   -- R4 17-2 UL gap pattern for Tx power management
 ul-GapFR2-Pattern-r17  BIT STRING (SIZE(4)) OPTIONAL
 ntn-Parameters-r17  NTN-Parameters-r17 OPTIONAL,
 nonCriticalExtension  UE-NR-Capability-v17xy OPTIONAL
}
```

1102

```
UE-NR-Capability-v17xy ::= SEQUENCE {
 redCapLongOffsetSupport-r17  ENUMERATED {supported} OPTIONAL,
 nonCriticalExtension  SEQUENCE {} OPTIONAL
}
```

FIG. 11

TIME-DOMAIN OFFSET FOR NON-CELL DEFINING SYNCHRONIZATION SIGNAL BLOCK

CROSS-REFERENCE TO RELATED APPLICATIONS

This application claims priority to U.S. Provisional Application No. 63/395,661, entitled "Time-Domain Offset for Non-Cell Defining Synchronization Signal Block," filed on Aug. 5, 2022, and Patent Cooperation Treaty Application No. PCT/US2022/049454, entitled "Time-Domain Offset for Non-Cell Defining Synchronization Signal Block," filed on Nov. 9, 2022, the disclosures of which are incorporated by reference herein in their entireties for all purposes.

BACKGROUND

Third Generation Partnership Project (3GPP) Technical Specifications (TSs) define standards for wireless networks. These TSs describe aspects related to user equipment designed with reduced capabilities. 3GPP networks provide for reference signals that can be utilized for various synchronization operations, such as time domain synchronization, frequency synchronization, and/or identification of a cell and corresponding critical system information. For example, base stations of the network can transmit synchronization signal blocks (SSBs) to user equipments (UEs) of the network for synchronization operations.

The base stations transmit different reference signals for different UEs. In particular, the base stations transmit cell defining synchronization signal and physical broadcast channel block (CD-SSB) for UEs with full capability and transmit non-cell defining synchronization signal and physical broadcast channel block (NCD-SSB) for reduced capability (RedCap) UEs. In legacy approaches, the CD-SSB have a maximum periodicity of 20 milliseconds (ms). Further, the NCD-SSB are limited to offsets of 5 ms, 10 ms, or 15 ms from the CD-SSD.

BRIEF DESCRIPTION OF THE DRAWINGS

FIG. 2 illustrates an example synchronization signal and physical broadcast channel block (SSB) information element (IE) in accordance with some embodiments.

FIG. 3 illustrates an example non-cell defining (NCD)-SSB information element (IE) in accordance with some embodiments.

FIG. 11 illustrates a user equipment (UE) capability IE in accordance with some embodiments.

DETAILED DESCRIPTION

Figure 1:
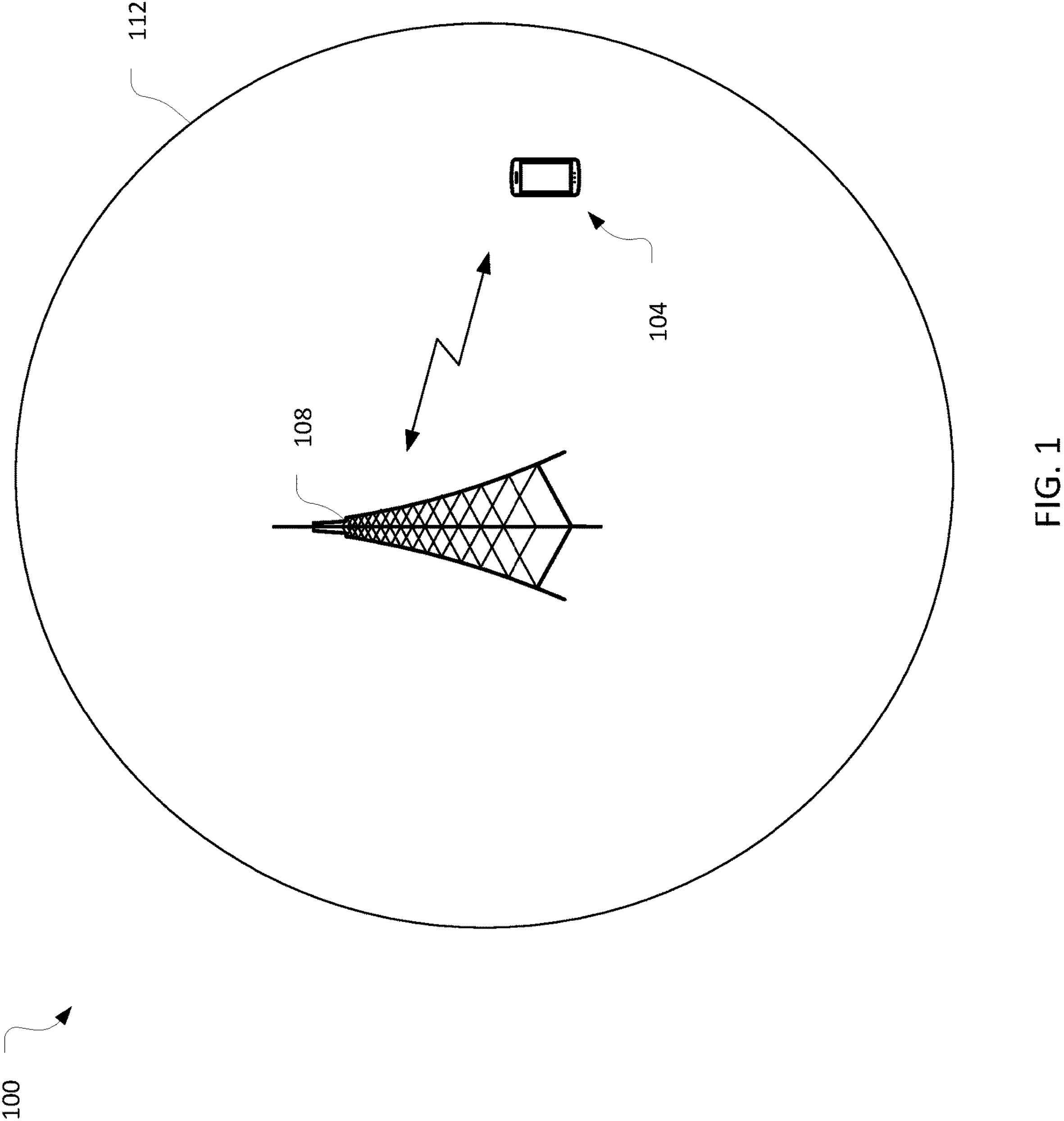
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, and techniques in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A/B" and "A or B" mean (A), (B), or (A and B); and the phrase "based on A" means "based at least in part on A," for example, it could be "based solely on A" or it could be "based in part on A."

The following is a glossary of terms that may be used in this disclosure.

The term "circuitry" as used herein refers to, is part of, or includes hardware components that are configured to provide the described functionality. The hardware components may include an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or a digital signal processor (DSP). In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, and network interface cards.

The term “user equipment” or “UE” as used herein refers to a device with radio communication capabilities that may allow a user to access network resources in a communications network. The term “user equipment” or “UE” may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term “user equipment” or “UE” may include any type of wireless/wired device or any computing device including a wireless communications interface.

The term “computer system” as used herein refers to any type interconnected electronic devices, computer devices, or components thereof. Additionally, the term “computer system” or “system” may refer to various components of a computer that are communicatively coupled with one another. Furthermore, the term “computer system” or “system” may refer to multiple computer devices or multiple computing systems that are communicatively coupled with one another and configured to share computing or networking resources.

The term “resource” as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A “hardware resource” may refer to compute, storage, or network resources provided by physical hardware elements. A “virtualized resource” may refer to compute, storage, or network resources provided by virtualization infrastructure to an application, device, or system. The term “network resource” or “communication resource” may refer to resources that are accessible by computer devices/systems via a communications network. The term “system resources” may refer to any kind of shared entities to provide services, and may include computing or network resources. System resources may be considered as a set of coherent functions, network data objects or services, accessible through a server where such system resources reside on a single host or multiple hosts and are clearly identifiable.

The term “channel” as used herein refers to any transmission medium, either tangible or intangible, which is used to communicate data or a data stream. The term “channel” may be synonymous with or equivalent to “communications channel,” “data communications channel,” “transmission channel,” “data transmission channel,” “access channel,” “data access channel,” “link,” “data link,” “carrier,” “radiofrequency carrier,” or any other like term denoting a pathway or medium through which data is communicated. Additionally, the term “link” as used herein refers to a connection between two devices for the purpose of transmitting and receiving information.

The terms “instantiate,” “instantiation,” and the like as used herein refers to the creation of an instance. An “instance” also refers to a concrete occurrence of an object, which may occur, for example, during execution of program code.

The term “connected” may mean that two or more elements, at a common communication protocol layer, have an established signaling relationship with one another over a communication channel, link, interface, or reference point.

The term “network element” as used herein refers to physical or virtualized equipment or infrastructure used to provide wired or wireless communication network services. The term “network element” may be considered synonymous to or referred to as a networked computer, networking hardware, network equipment, network node, or a virtualized network function.

The term “information element” refers to a structural element containing one or more fields. The term “field” refers to individual contents of an information element, or a data element that contains content. An information element may include one or more additional information elements.

Figure 13:
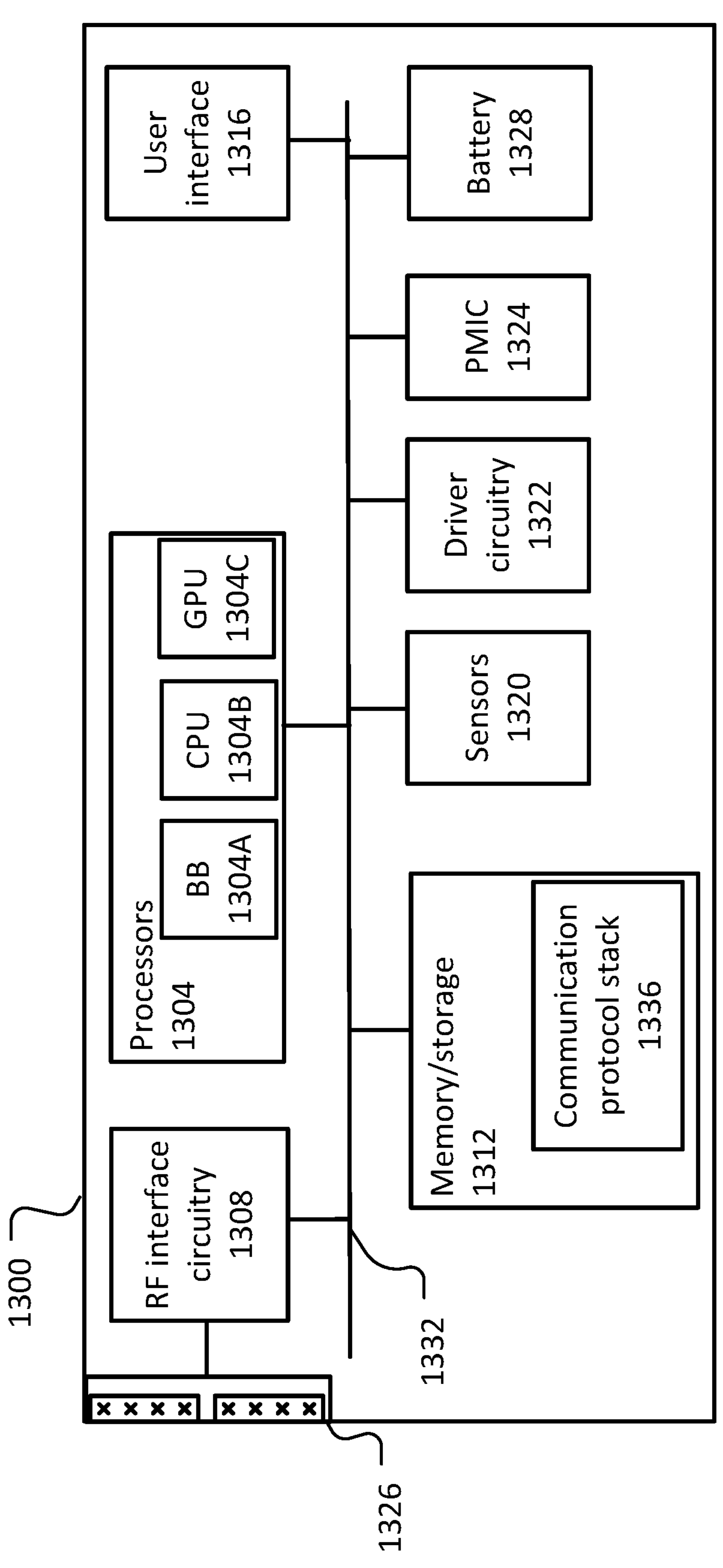
FIG. 13 illustrates an example UE in accordance with some embodiments.
Figure 14:
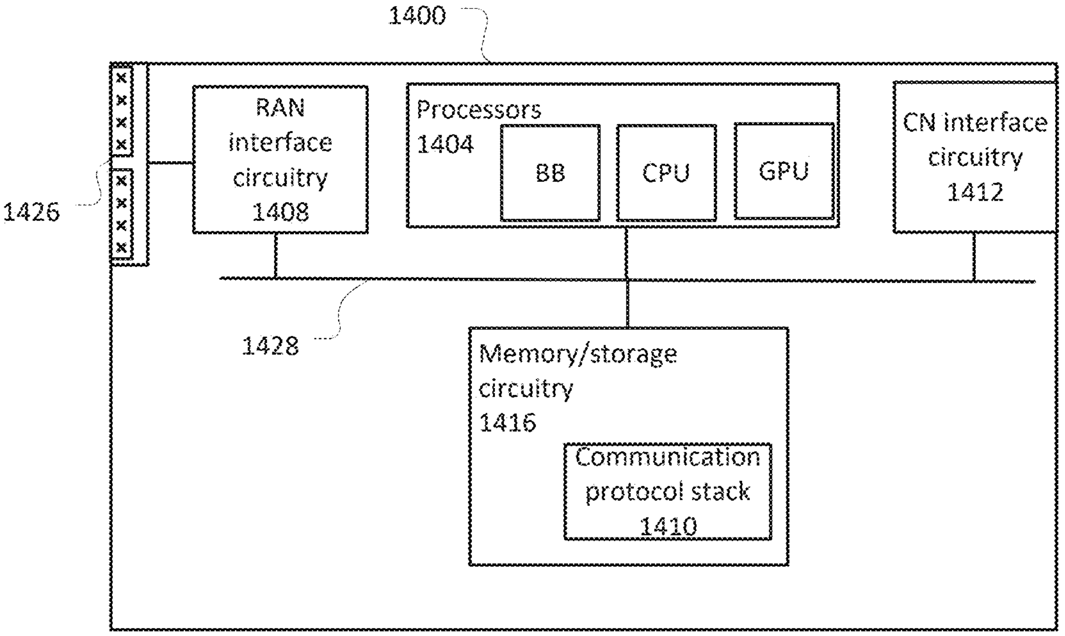
FIG. 14 illustrates an example next generation nodeB (gNB) in accordance with some embodiments.

FIG. 1 illustrates a network environment 100 in accordance with some embodiments. The network environment 100 may include a user equipment (UE) 104 communicatively coupled with a base station 108 of a radio access network (RAN). The UE 104 may include one or more of the features of the UE 1300 (FIG. 13). The base station 108 may include one or more of the features of the next generation nodeB (gNB) 1400 (FIG. 14). The UE 104 and the base station 108 may communicate over air interfaces compatible with Third Generation Partnership Project (3GPP) technical specifications (TSs) such as those that define a Fifth Generation (5G) new radio (NR) system or a later system. The base station 108 may provide user plane and control plane protocol terminations toward the UE 104 through a serving cell 112.

The base station 108 may transmit (either via broadcast or direct communication) one or more synchronization signal and physical broadcast channel blocks (SSBs) to UEs (such as the UE 104) in the network environment 100. An SSB may be used by the UE 104 as a reference signal for various synchronization activities. These synchronization activities may include a time-domain synchronization, frequency synchronization, and/or identification of a serving cell and corresponding critical system information (for example, numerology of the broadcast channel, etc.).

In some embodiments, the UE 104 may be a reduced capability (RedCap) UE that is to operate with “reduced capabilities.” These reduced capabilities may mean the UE 104 can only operate in a 20 MHz bandwidth; can only operate in non-carrier aggregation (CA), dual-connectivity (DC) configuration; and/or can only work with 12-bit radio link control (RLC) and packet data convergence protocol (PDCP) modes, etc.

Legacy base stations ‘can’ support RedCap UEs (if configured to do so) even when the legacy base station supports cell and bandwidth parts (BWPs) with bandwidths wider than 20 MHz.

The base station 108 ‘can’ broadcast a separate SSB that is meant for the RedCap UEs in certain cases where the RedCap UEs cannot operate with existing SSBs. Consider, for example, that a dedicated BWP is configured for the RedCap UE 104, and it is not efficient from the network perspective for the RedCap UE 104 to use the legacy SSB in this BWP. In this case, the base station 108 may configure the UE 104 with a non-cell-defining (NCD) SSB. The RedCap UE 104 may use this NCD-SSB (only) in CONNECTED mode as if it is a legacy SSB (which the legacy SSB may be referred to as cell defining (CD)-SSB), as long as the UE 104 operates in that BWP. CD-SSB may include information that identifies a cell, whereas NCD-SSB may omit any information that identifies a cell in some embodiments.

If the UE 104 switches to another BWP, it is up to the base station configuration on whether the UE 104 should use the NCD-SSB in that BWP or the UE 104 should use a CD-SSB. For example, the base station 108 may transmit a configuration message to the UE 104 to configure the UE 104 to utilize the NCD-SSB or the CD-SSB when the UE 104 switches to another BWP.

An NCD-SSB may be configured for each BWP for the UE 104. Although a BWP without an NCD-SSB may also be possible. The UE 104 may be given the periodicity and/or offset of the NCD-SSB with respect to a CD-SSB. The periodicity and/or the offset may be periodicity and/or offset in the time domain. The NCD-SSB can have a periodicity larger than the legacy CD-SSB.

A legacy NCD-SSB configuration may have an offset based on a default SSB assumption of a 20 millisecond (ms) periodicity. The NCD-SSB may be set at an offset in increments of half-frames (e.g., 5 ms) from existing legacy CD-SSB. In legacy NCD-SSB configuration, the offset of the NCD-SSB was limited to 5 ms, 10 ms, and 15 ms. The CD-SSB can have periodicities of 5 ms, 10 ms, 20 ms, 40 ms, 80 ms, or 160 ms.

FIG. 2 illustrates an example SSB information element (IE) 200 in accordance with some embodiments. The SSB IE 200 may be utilized for defining a periodicity and/or offset of a CD-SSB.

The SSB IE 200 may include one or more periodicity and corresponding offset choices 202 from which a base station (such as the base station 108 (FIG. 1) and/or the gNB 1400 (FIG. 14)) may select for configuring a UE (such as the UE 104 (FIG. 1) and/or the UE 1300 (FIG. 13)). The periodicity and/or the offset may be periodicity and/or offset in the time domain. In the illustrated embodiments, the periodicity and corresponding offset choices 202 may include a first choice 204 corresponding to a periodicity of 5 ms, a second choice 206 corresponding to a periodicity of 10 ms, a third choice 208 corresponding to a periodicity of 20 ms, a fourth choice 210 corresponding to a periodicity of 40 ms, a fifth choice 212 corresponding to a periodicity of 80 ms, and a sixth choice 214 corresponding to a periodicity of 160 ms. The base station may select the first choice 204, the second choice 206, the third choice 208, the fourth choice 210, the fifth choice 212, or the sixth choice 214 to be utilized for CD-SSBs. Accordingly, the base station may configure CD-SSB transmissions with periodicity of 5 ms, 10 ms, 20 ms, 40 ms, 80 ms, or 160 ms.

Each of the periodicity and corresponding offset choices 202 of the SSB IE 200 may provide choices of offsets for the CD-SSBs. In the illustrated embodiment, the first choice 204 may provide offset value choices from 0 to 4. The second choice 206 may provide offset value choices from 0 to 9. The third choice 208 may provide offset value choices from 0 to 19. The fourth choice 210 may provide offset value choices from 0 to 39. The fifth choice 212 may provide offset value choices from 0 to 79. The sixth choice 214 may provide offset value choices from 0 to 159.

The base station may select a periodicity and offset from the periodicity and corresponding offset choices 202. The base station may transmit (via broadcast or direct communication) a configuration message with the SSB IE 200 that indicates the selected periodicity and offset to configure one or more UEs for receiving CD-SSBs. The base station may transmit CD-SSBs in accordance with the selected periodicity and offset.

FIG. 3 illustrates an example NCD-SSB IE 300 in accordance with some embodiments. The NCD-SSB IE 300 may be utilized for defining a periodicity and/or offset of an NCD-SSB.

The NCD-SSB IE 300 may include a periodicity field 302 and a time offset field 304. The periodicity field 302 may be utilized for defining a periodicity for NCD-SSB transmissions. The periodicity may be periodicity in the time domain. In illustrated embodiment, the periodicity field 302 may include options for a period of 5 ms, 10 ms, 20 ms, 40 ms, 80 ms, and 160 ms for the NCD-SSB. One of the periods from the periodicity field 302 may be selected to be utilized for the NCD-SSB. The time offset field 304 may be utilized for defining a time offset for NCD-SSB transmissions. The time offset may be time offset in the time domain. In the illustrated embodiment, the time offset field 304 may include options for a time offset of 5 ms, 10 ms, and 15 ms for the NCD-SSB. One of the time offsets from the time offset field 304 may be selected to be utilized for the NCD-SSB.

A base station (such as the base station 108 (FIG. 1) and/or the gNB 1400 (FIG. 14)) may select a period from the periodicity field 302 and a time offset from the time offset field 304. The base station may generate a configuration message that includes the NCD-SSB IE 300 that indicates the selected period and the selected time offset, and may transmit (via broadcast or direct communication) the configuration message to one or more UEs to configure the UEs for receiving NCD-SSBs. The base station may then transmit NCD-SSB transmissions in accordance with the selected period and the selected time offset.

Figure 4:
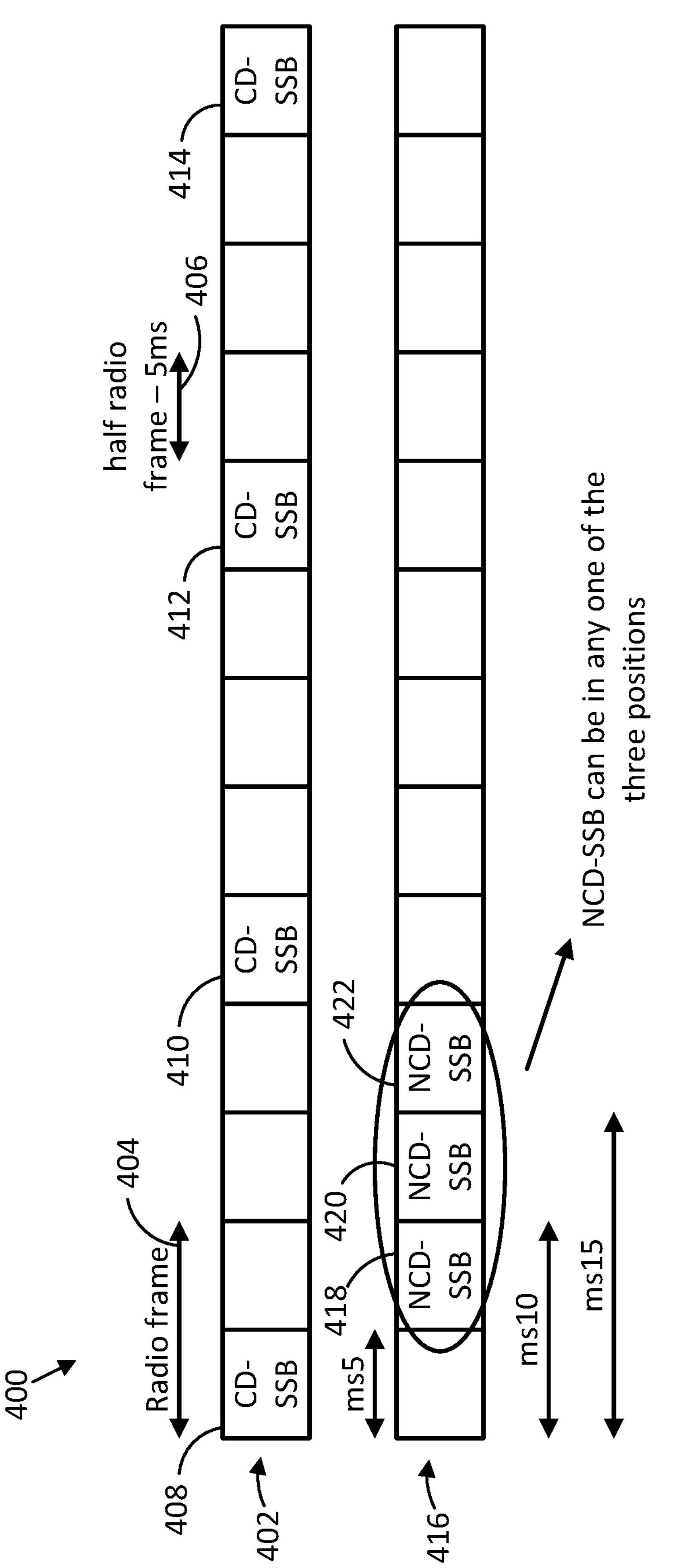
FIG. 4 illustrates an example resource chart showing an SSB arrangement in accordance with some embodiments.

FIG. 4 illustrates an example resource chart 400 showing an SSB arrangement in accordance with some embodiments. In particular, the resource chart 400 illustrates example radio resources for CD-SSB transmissions and NCD-SSB transmissions in accordance with some embodiments.

The resource chart 400 includes a CD-SSB radio resource arrangement 402. The CD-SSB radio resource arrangement 402 illustrates radio resources available for CD-SSB transmissions. The illustrated embodiment, the CD-SSB transmissions may be configured with the periodicity of 20 ms and an offset value of zero. Further, the CD-SSB transmissions may be configured with a duration of 5 ms. A radio frame 404 may have a duration of 10 ms. Accordingly, a CD-SSB transmission may have a duration of half of a radio frame 406. In the illustrated embodiment, a first CD-SSB transmission 408 is transmitted at a beginning of the CD-SSB radio resource arrangement 402, a second CD-SSB transmission 410 is transmitted 20 ms after the first CD-SSB transmission 408, a third CD-SSB transmission 412 is transmitted 20 ms after the second CD-SSB transmission 410, and a fourth CD-SSB transmission 414 is transmitted 20 ms after the third CD-SSB transmission 412.

The resource chart 400 includes an NCD-SSB radio resource arrangement 416. The NCD-SSB radio resource arrangement 416 illustrates examples of some radio resources with which NCD-SSB transmissions can be transmitted based on different configurations. The radio resources for the NCD-SSB transmissions can be based on a configured offset. The offset can be configured by an NCD-SSB IE (such as the NCD-SSB IE 300 (FIG. 3)), and can be configured with an offset value of 5 ms, 10 ms, or 15 ms. The offset may be measured from a CD-SSB. In the illustrated embodiment, the offset of the illustrated NCD-SSB transmission may be relative to the first CD-SSB transmission 408. The NCD-SSB radio resource arrangement 416 illustrates possible times for the NCD-SSB transmissions based on the possible offsets. In particular, the NCD-SSB radio resource arrangement 416 illustrates a first NCD-SSB resource 418 that corresponds to the offset of 5 ms, a second NCD-SSB resource 420 that corresponds to the offset of 10 ms, and a third NCD-SSB resource 422 that corresponds to the offset of 15 ms. An NCD-SSB transmission may be transmitted by any of the three NCD-SSB resources based on the offset configured by the base station.

If the CD-SSB has a periodicity larger than 20 ms, the legacy signaling may not provide the UE with an accurate offset. As can be seen from the resource chart 400, the resources for the NCD-SSB are limited. In instances where the periodicity of the CD-SSB is greater than the 20 ms illustrated, there could be additional resources available for transmissions that could not be utilized for NCD-SSB transmissions due to the offset being limited to 5 ms, 10 ms, or 15 ms.

Figure 5:
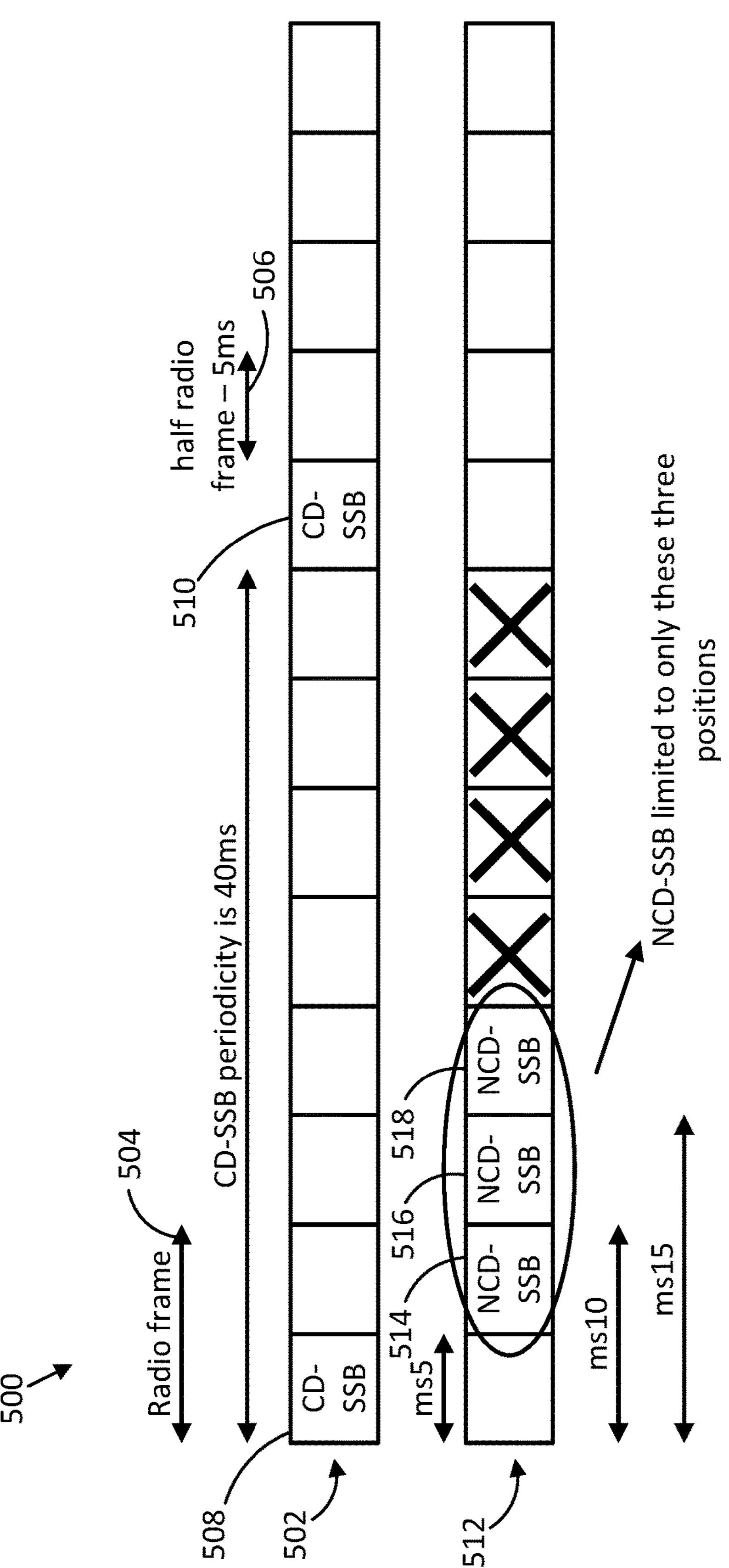
FIG. 5 illustrates another example resource chart showing an SSB arrangement in accordance with some embodiments.

FIG. 5 illustrates another example resource chart 500 showing an SSB arrangement in accordance with some embodiments. In particular, the resource chart 500 illustrates example resources for CD-SSB transmissions and NCD-SSB transmissions in accordance with some embodiments.

The resource chart 500 includes a CD-SSB radio resource arrangement 502. The CD-SSB radio resource arrangement 502 illustrates radio resources available for CD-SSB transmissions. In the illustrated embodiment, the CD-SSB transmissions may be configured with the periodicity of 40 ms and an offset value of zero. Further, the CD-SSB transmissions may be configured with a duration of 5 ms. A radio frame 504 may have a duration of 10 ms. Accordingly, a CD-SSB transmission may have a duration of half of a radio frame 506. In the illustrated embodiment, a first CD-SSB transmission 508 is transmitted at a beginning of the CD-SSB radio resource arrangement 502, and a second CD-SSB transmission 510 is transmitted 40 ms after the first CD-SSB transmission 508.

The resource chart 500 includes an NCD-SSB radio resource arrangement 512. The NCD-SSB radio resource arrangement 512 illustrates examples of some resources with which NCD-SSB transmissions can be transmitted based on different configurations. The radio resources for the NCD-SSB transmissions can be based on a configured offset. The offset can be configured by an NCD-SSB IE (such as the NCD-SSB IE 300 (FIG. 3)), and can be configured with an offset value of 5 ms, 10 ms, or 15 ms. The offset may be measured from a CD-SSB. In the illustrated embodiment, the offset of the illustrated NCD-SSB transmission may be relative to the first CD-SSB transmission 508. The NCD-SSB radio resource arrangement 512 illustrates possible radio resources for the NCD-SSB transmissions based on the possible offsets. In particular, the NCD-SSB radio resource arrangement 512 illustrates a first NCD-SSB radio resource 514 that corresponds to the offset of 5 ms, a second NCD-SSB radio resource 516 that corresponds to the offset of 10 ms, and a third NCD-SSB radio resource 518 that corresponds to the offset of 15 ms. An NCD-SSB transmission may be transmitted on any of the three NCD-SSB radio resources based on the offset configured by the base station.

As can be seen from the resource chart 500, the radio resources that are available for NCD-SSB transmissions based on the 5 ms, 10 ms, and 15 ms offsets are the first three radio resources after the CD-SSB transmission being utilized as a reference. However, due to the periodicity of the CD-SSB being 40 ms, there are additional radio resources between adjacent CD-SSB transmissions that are unable to be utilized for NCD-SSB based on the offsets for the NCD-SSB being limited to 5 ms, 10 ms, and 15 ms. For example, see the radio resources within the NCD-SSB radio resource arrangement 512 of FIG. 5 in which the CD-SSB periodicity is 40 ms. With the legacy signaling, NCD-SSB is limited to the three radio resources shown and is not able to use the radio resources marked with an X in the NCD-SSB radio resource arrangement 512.

UEs and networks (NWs) that implement legacy versions of the TSs may not understand any changes made to the specification in the future. For example, a UE that implements a current version of the TSs may not be configured with an NCD-SSB that has an offset that is greater than 15 ms. In particular, legacy NCD-SSB IE (such as legacy versions of the NCD-SSB IE 300 (FIG. 3)) may not be defined to have an offset for NCD-SSB greater than 15 ms and attempting to enter offsets greater than 15 ms into the legacy NCD-SSB IE may cause issues and/or errors in the 3GPP network due to UEs and/or network elements within the network being unable to interpret and implement offsets greater than 15 ms.

Even in cases where the network and the UE support handling CD-SSB that is greater than 20 ms in periodicity and NCD-SSB whose periodicity is also greater than 20 ms, with legacy signaling there is an ambiguity on how the UE references the CD-SSB/NCD-SSB offset. For example, the network and/or the UEs may be unable to determine the CD-SSB to which the offset for the NCD-SSB is to be applied to determine the radio resources for the NCD-SSB.

Figure 6:
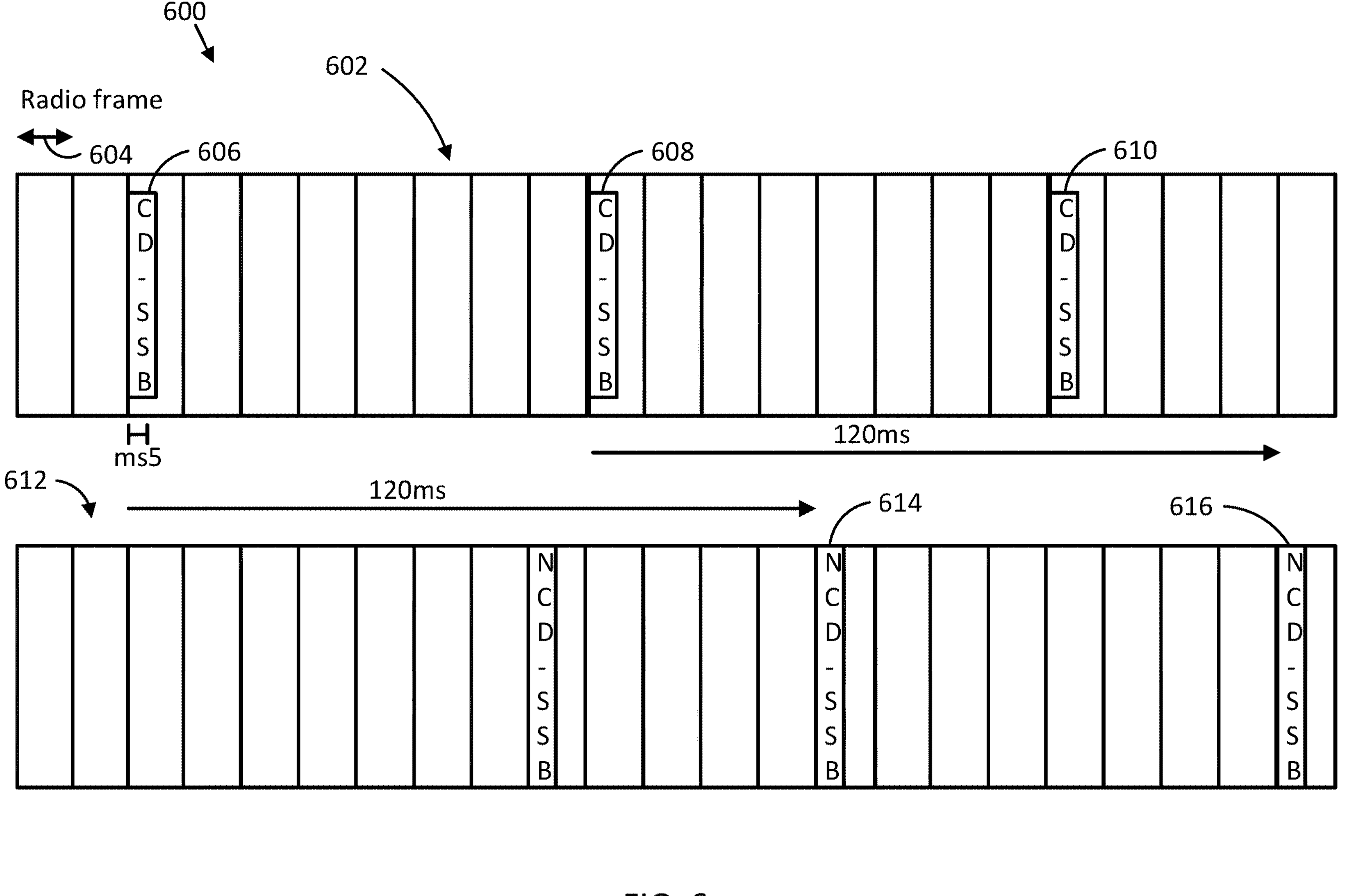
FIG. 6 illustrates another example resource chart showing an SSB arrangement in accordance with some embodiments.

FIG. 6 illustrates another example resource chart 600 showing an SSB arrangement in accordance with some embodiments. In particular, the resource chart 600 illustrates example resources for CD-SSB transmissions and NCD-SSB transmissions in accordance with some embodiments.

Resource chart 600 includes a CD-SSB radio resource arrangement 602. The CD-SSB radio resource arrangement 602 resources available for CD-SSB transmissions. In the illustrated embodiment, the CD-SSB transmissions may be configured with the periodicity of 80 ms and an offset value of zero. Further, the CD-SSB transmissions may be configured with a duration of 5 ms. A radio frame 604 may have a duration of 10 ms. Accordingly, a CD-SSB transmission may have a duration of half a radio frame. In the illustrated embodiment, a first CD-SSB transmission 606 is transmitted at a first time. A second CD-SSB transmission 608 is transmitted 80 ms after the first CD-SSB transmission 606, and a second CD-SSB transmission 610 is transmitted 80 ms after the second CD-SSB transmission 608.

The resource chart 600 includes an NCD-SSB radio resource arrangement 612. The NCD-SSB radio resource arrangement 612 illustrates examples of some resources with which NCD-SSB transmissions can be transmitted based on different configurations. In the illustrated embodiment, the NCD-SSB may be configured with an offset of 120 ms. However, a UE configured with the offset of 120 ms may not know to which CD-SSB the offset for the NCD-SSB is to be applied. In the illustrated embodiment, the NCD-SSB radio resource arrangement 612 includes a first NCD-SSB radio resource 614 and a second NCD-SSB radio resource 616. The first NCD-SSB radio resource 614 is offset from the first CD-SSB transmission 606 by 120 ms. The second NCD-SSB radio resource 616 is offset from the second CD-SSB transmission 608 by 120 ms. However, the configuration of the offset for the NCD-SSB may refer to only one of the first CD-SSB transmission 606 or the second CD-SSB transmission 608. Accordingly, only one of the first NCD-SSB radio resource 614 and the second NCD-SSB radio resource 616 may be utilized for NCD-SSB transmission by a base station, although the UE may be unaware of which of the first NCD-SSB radio resource 614 and the second NCD-SSB radio resource 616 is to be utilized for the NCD-SSB transmission by the base station. For example, a UE using legacy signaling may not know the location to assume for the presence of NCD-SSB between the first NCD-SSB radio resource 614 and the second NCD-SSB radio resource 616.

Various embodiments describe configurations of NCD-SSB to provide greater flexibility. The network (for example, base station 108 (FIG. 1)) can configure offsets that cater to all legal CD-SSB configurations, so that NCD-SSB can be offset to this. In particular, an NCD-SSB may be offset to 40 ms, 80 ms and 160 ms CD-SSB periodicities. A configuration corresponding to a 40 ms CD-SSB periodicity may carry NCD-SSB offset values from 5 ms to 35 ms. A configuration corresponding to an 80 ms CD-SSB periodicity may carry NCD-SSB offset values from 5 ms to 75 ms. A configuration corresponding to a 160 ms CD-SSB periodicity may carry NCD-SSB offset values from 5 ms to 155 ms. For example, in instances where the periodicity of the CD-SSB is 40 ms, an NCD-SSB IE (such as the NCD-SSB IE 300 (FIG. 3)) may have offset values of 5 ms, 10 ms, 15 ms, 20 ms, 25 ms, 30 ms, and 35 ms. In instances where the periodicity of the CD-SSB is 80 ms, an NCD-SSB IE may have offset values of 5 ms, 10 ms, 15 ms, 20 ms, 25 ms, 30 ms, 35 ms, 40 ms, 45 ms, 50 ms, 55 ms, 60 ms, 65 ms, 70 ms, and 75 ms. In instances where the periodicity of the CD-SSB is 160 ms, an NCD-SSB IE may have offset values of 5 ms, 10 ms, 15 ms, 20 ms, 25 ms, 30 ms, 35 ms, 40 ms, 45 ms, 50 ms, 55 ms, 60 ms, 65 ms, 70 ms, 75 ms, 80 ms, 85 ms, 90 ms, 95 ms, 100 ms, 105 ms, 110 ms, 115 ms, 120 ms, 125 ms, 130 ms, 135 ms, 140 ms, 145 ms, 150 ms, and 155 ms.

The configuration that carries the offset for NCD-SSB may also carry the reference SSB from which the offset is to be calculated. For example, a configuration message that indicates the offset for NCD-SSB may indicate which CD-SSB is to be utilized as a reference for the offset. This may be signaled in a number of different ways according to various embodiments. The window in which the UE 104 (FIG. 1) assumes the start of the CD-SSB may be based on the maximum of periodicities of the CD-SSB and NCD-SSB, and the offset may be applied from the first CD-SSB in that window. The window start may be given with explicit signaling with system frame number (SFN)/slot value, or the window start may be from the CD-SSB with SFN/slot 0.

Figure 7:
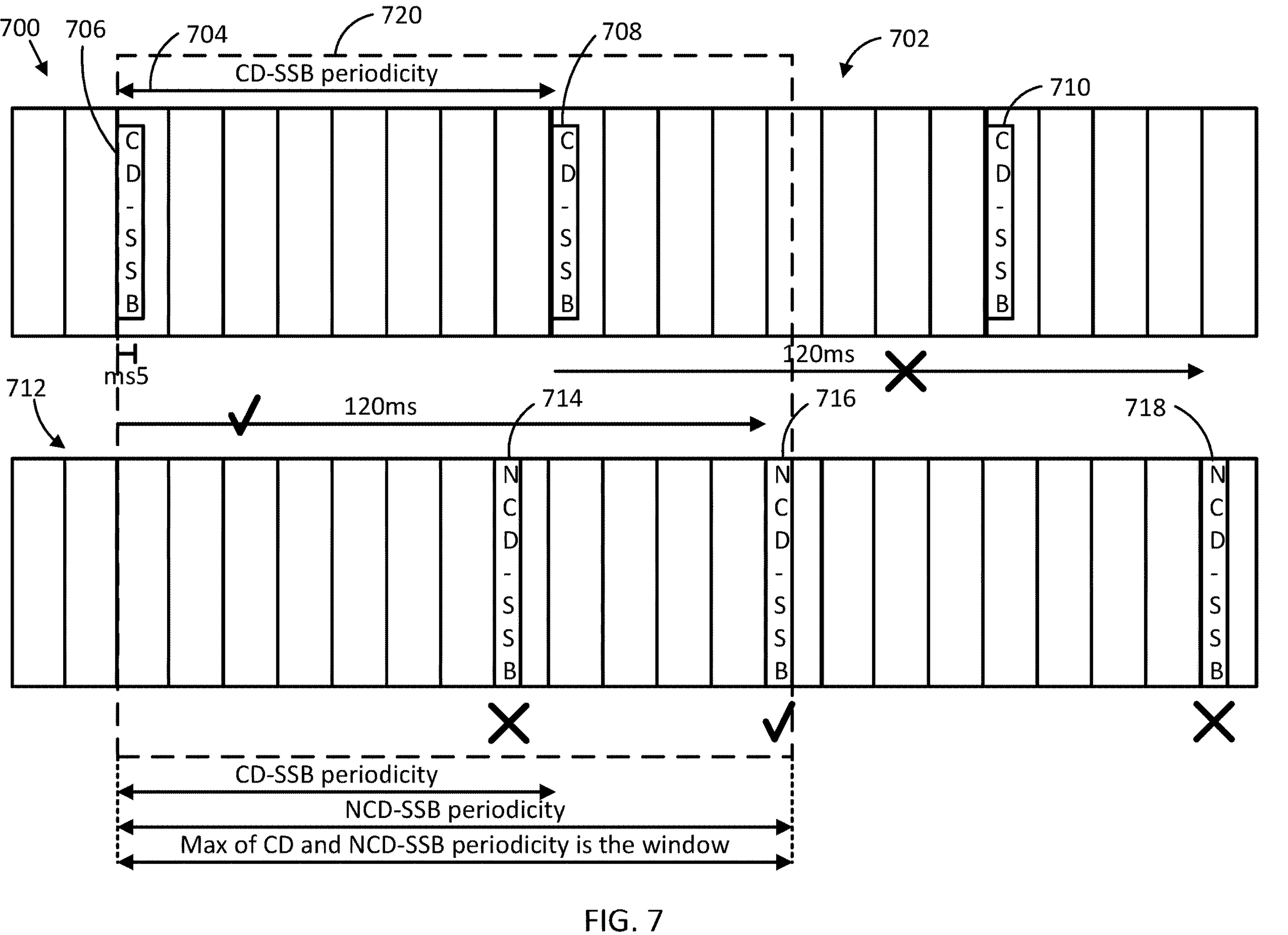
FIG. 7 illustrates another example resource chart showing an SSB arrangement in accordance with some embodiments.

FIG. 7 illustrates another example resource chart 700 showing an SSB arrangement in accordance with some embodiments. In particular, the resource chart 700 illustrates example resources for CD-SSB transmissions and NCD-SSB transmissions in accordance with some embodiments. The resource chart 700 further illustrates approaches for determining to which CD-SSB an offset for NCD-SSB is to be applied to determine in which radio resource an NCD-SSB is to be transmitted.

The resource chart 700 includes a CD-SSB radio resource arrangement 702. The CD-SSB radio resource arrangement 702 illustrates resources available for CD-SSB transmissions. In the illustrated embodiment, the CD-SSB transmissions may be configured with the periodicity 704 of 80 ms and offset value of zero. Further, the CD-SSB transmissions may be configured with a duration of 5 ms. In the illustrated embodiment, a first CD-SSB transmission 706 is transmitted within a first radio resource within the CD-SSB radio resource arrangement 702. A second CD-SSB transmission 708 is transmitted 80 ms after the first CD-SSB transmission 706, and a third CD-SSB transmission 710 is transmitted 80 ms after the second CD-SSB transmission 708. The first radio resource within which the first CD-SSB transmission 706 is transmitted may be associated with an SFN value of zero or a slot value of zero.

The resource chart 700 includes an NCD-SSB radio resource arrangement 712. The NCD-SSB radio resource arrangement 712 illustrates resources with which NCD-SSB transmissions can be transmitted based on a configuration. The radio resources for the NCD-SSB transmissions can be based on a configured offset. The offset can be configured by an NCD-SSB IE (such as the NCD-SSB IE 300 (FIG. 3)). In the illustrated embodiment, the offset can be configured for 120 ms. In the illustrated embodiment, a first NCD-SSB radio resource 714, a second NCD-SSB radio resource 716, and third NCD-SSB radio resource 718 is illustrated in the NCD-SSB radio resource arrangement 712. The first NCD-SSB radio resource 714 may be offset 120 ms from a CD-SSB transmitted prior to the radio resources shown in the CD-SSB radio resource arrangement 702. The second NCD-SSB radio resource 716 may be offset 120 ms from the first CD-SSB transmission 706. The third NCD-SSB radio resource 718 may be offset 120 ms from the second CD-SSB transmission 708.

While the three NCD-SSB radio resources are illustrated, a base station may be configured to transmit NCD-SSB during only a portion of the three NCD-SSB radio resources. For example, the base station may be configured to utilize a portion of the CD-SSB transmissions within the CD-SSB radio resource arrangement 702 for references to offsets for the NCD-SSB.

A UE coupled to the base station may determine which CD-SSB is to be utilized for the offset of the NCD-SSB based on information related to the CD-SSB transmissions. For example, the UE may determine a window 720 in which a CD-SSB to be utilized for the offset is to be located. The window 720 may define a time period in which the CD-SSB to be utilized for the offset is to be received. In some embodiments, the window 720 may have a duration based on the maximum value of the periodicities of the CD-SSB and the NCD-SSB. In particular, the duration of the window 720 may be equal to the larger of the periodicity of the CD-SSB or the periodicity of the NCD-SSB. The start of the window 720 may be indicated by explicit signaling in some embodiments, where the explicit signaling may indicate an SFN or a slot value where the window 720 is to start. In other embodiments, the window 720 is to start from a CD-SSB associated with the SFN or slot value of 0. The UE may determine that a first CD-SSB occurring within the window is the CD-SSB to which an offset of an NCD-SSB is to be applied.

In the illustrated embodiment, the window 720 may have been configured to start from a CD-SSB associated with SFN 0. The first CD-SSB transmission 706 in the illustrated embodiment may be associated with SFN 0. The UE may determine that the window 720 is to start from the first CD-SSB transmission 706 based on the window 720 being configured to start from the CD-SSB associated with SFN 0 and the first CD-SSB transmission 706 being associated with the SFN 0.

The UE may compare the periodicity of the CD-SSB and the periodicity of the NCD-SSB to determine the duration of the window 720. The UE may determine that the duration of the window 720 is equal to the larger of the periodicity of the CD-SSB and the periodicity of the NCD-SSB. In the illustrated embodiment, the CD-SSB may be configured with a periodicity of 80 ms and the NCD-SSB may be configured with a periodicity of 120 ms. The UE may compare the periodicities and determine that the periodicity of the NCD-SSB of 120 ms is the larger of the periodicities. The UE may determine that the duration of the window 720 is to be equal to 120 ms based on the NCD-SSB having the larger periodicity of 120 ms. The UE may define the window to run for a duration of 120 ms from the start of the first CD-SSB transmission 706.

The UE may determine that the first CD-SSB transmission 706 and the second CD-SSB transmission 708 are within the window 720 in the illustrated embodiment. The UE may be configured to determine that the first CD-SSB transmission within the window is to be utilized as the CD-SSB to which the offset is to be applied for determining the radio resource to be utilized for the NCD-SSB transmission. As the first CD-SSB transmission 706 is received prior to the second CD-SSB transmission 708, the UE may determine that the first CD-SSB transmission 706 is the first CD-SSB transmission within the window.

The UE may apply the offset to the first CD-SSB transmission within the window to determine the radio resource in which the NCD-SSB is to be received. In the illustrated embodiment, the UE may apply the configured 120 ms offset to the first CD-SSB transmission 706 to determine the radio resource for the NCD-SSB. Applying the 120 ms offset to the first CD-SSB transmission 706 may indicate that the second NCD-SSB radio resource 716 is the radio resource in which the NCD-SSB is to be received. As the second CD-SSB transmission 708 is the second CD-SSB within the window 720 and the third NCD-SSB radio resource 718 is defined based on applying the 120 ms offset to the second CD-SSB transmission 708, the UE may determine that an NCD-SSB is not to be received within the third NCD-SSB radio resource 718 (as indicated by the 'X' below the radio resource) as the second CD-SSB transmission 708 is not to be utilized for determining the NCD-SSB.

In the instances where the window 720 is defined as being started from the CD-SSB associated with the SFN value of 0 or the slot value of 0, it should be understood that the CD-SSB associated with the SFN value of 0 or the slot value of 0 will be the first CD-SSB within the window 720. Accordingly, it should be understood that the offset will be applied from the CD-SSB associated with the SFN value of 0 or the slot value of 0 in these instances to determine when the NCD-SSB is to be received. Accordingly, the UE may determine that the offset is to be applied to the first CD-SSB transmission 706 to determine when the NCD-SSB is to be received in the illustrated embodiment based on the first CD-SSB transmission 706 being associated with the SFN value of 0.

The UE may be configured with information to determine which CD-SSB is to be utilized for determining when an NCD-SSB is to be received. A base station may transmit an NCD-SSB IE to the UE to configure the UE for determining when the NCD-SSB is to be received.

Figures 8, 9:
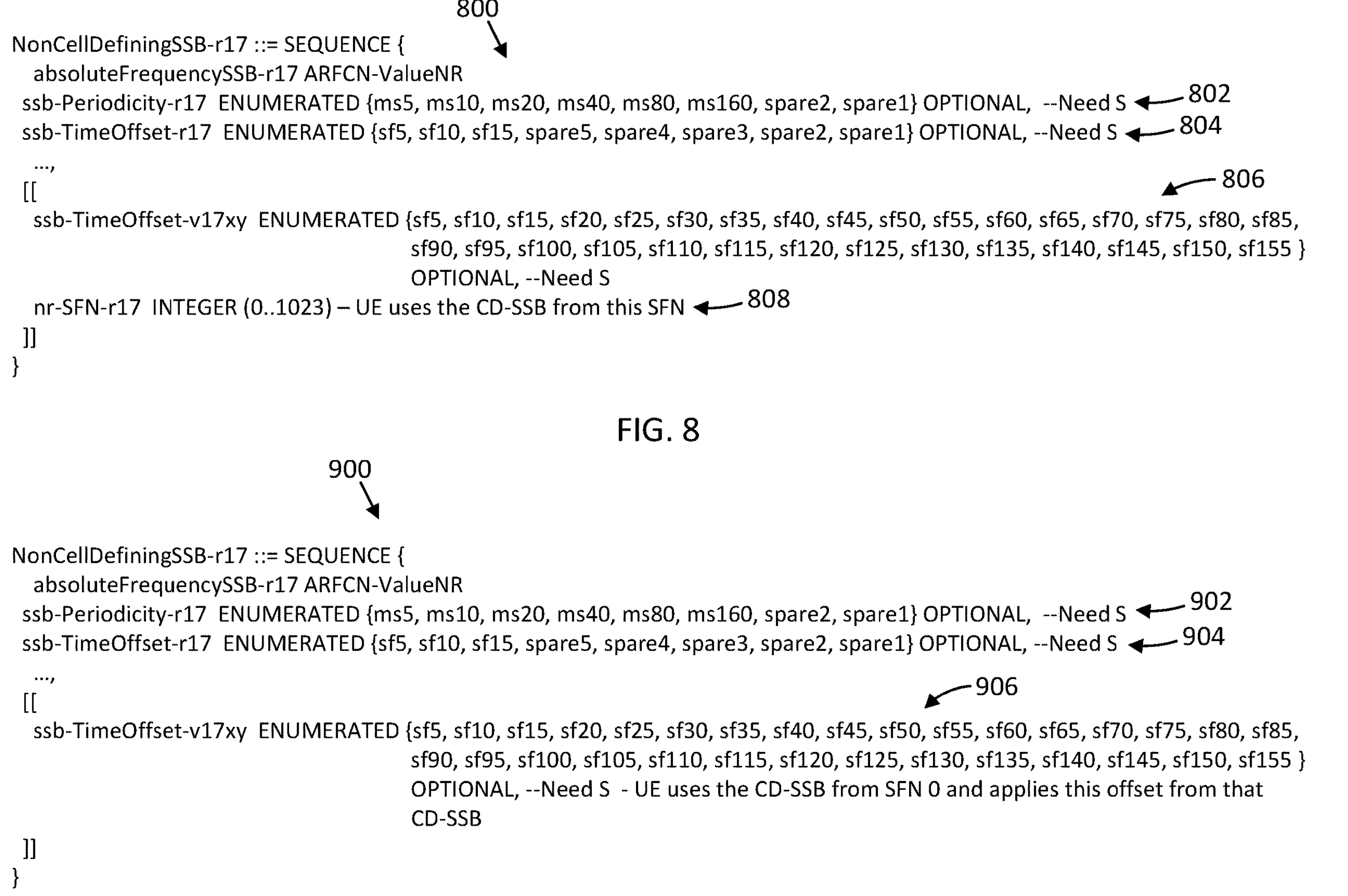
FIG. 8 illustrates an example NCD-SSB IE in accordance with some embodiments.
FIG. 9 illustrates an example NCD-SSB IE in accordance with some embodiments.

FIG. 8 illustrates an example NCD-SSB IE 800 in accordance with some embodiments. The NCD-SSB IE 800 may be utilized for configuring NCD-SSBs with offsets greater than 15 ms. For example, a base station (such as the base station 108 (FIG. 1) and/or the gNB 1400 (FIG. 14)) may transmit the NCD-SSB IE 800 to a UE (such as the UE 104 (FIG. 1) and/or the UE 1300 (FIG. 13)) to configure the UE for offsets for NCD-SSBs greater than 15 ms. The base station may transmit the NCD-SSB IE 800 in a configuration message to the UE.

The NCD-SSB IE 800 may include a periodicity field 802. The periodicity field 802 may be utilized for defining a periodicity for NCD-SSB. The periodicity field 802 may provide one or more values that can be selected for the periodicity for NCD-SSB. In the illustrated embodiment, the periodicity field 802 can allow selection of periodicities of 5 ms, 10 ms, 20 ms, 40 ms, 80 ms, and 160 ms. The NCD-SSB IE 800 may be transmitted with one of the values in the periodicity field 802 for defining the periodicity of the NCD-SSB.

The NCD-SSB IE 800 may include a first time offset field 804. The first time offset field 804 may be utilized for defining an offset for NCD-SSB for UEs that do not support offsets greater than 15 ms. For example, the first time offset field 804 may allow the NCD-SSB IE 800 to be backward compatible with UEs that support legacy approaches for configuring the offset for NCD-SSB. The first time offset field 804 may allow selection for offsets of 5 ms, 10 ms, and 15 ms. The NCD-SSB IE 800 may be transmitted with one of the values in the first time offset field 804 for defining the offset for the NCD-SSB. In embodiments where the NCD-SSB IE 800 is being transmitted to UEs that support offsets greater than 15 ms, the first time offset field 804 may be omitted from the NCD-SSB IE 800.

The NCD-SSB IE 800 may include a second time offset field 806. The second time offset field 806 may be utilized for defining an offset for NCD-SSB for UEs that support offsets greater than 15 ms. The second time offset field 806 may allow selection for offsets of 5 ms, 10 ms, 15 ms, 20 ms, 25 ms, 30 ms, 35 ms, 40 ms, 45 ms, 50 ms, 55 ms, 60 ms, 65 ms, 70 ms, 75 ms, 80 ms, 85 ms, 90 ms, 95 ms, 100 ms, 105 ms, 110 ms, 115 ms, 120 ms, 125 ms, 130 ms, 135 ms, 140 ms, 145 ms, 150 ms, and 155 seconds. The NCD-SSB IE 800 may be transmitted with one of the values in the second time offset field 806 for defining the offset for the NCD-SSB. In embodiments where the NCD-SSB IE 800 is being transmitted to UEs that does not support offsets greater than 15 ms, the second time offset field 806 may be omitted from the NCD-SSB IE 800.

The NCD-SSB IE 800 may include an SFN field 808. The SFN field 808 may be utilized for defining an SFN from which a window (such as the window 720 (FIG. 7)) is to be started and/or a CD-SSB to which an offset for the NCD-SSB is to be applied. The SFN field 808 may indicate an SFN number for the start of the window and/or CD-SSB. In the illustrated embodiment, the SFN value can be selected to be a value between 0 and 1023 for the SFN field 808. The NCD-SSB IE 800 may be transmitted with one of the values in the SFN field 808 for defining the SFN to be utilized for starting the window and/or selecting the CD-SSB from which the offset is to be applied.

FIG. 9 illustrates an example NCD-SSB IE 900 in accordance with some embodiments. The NCD-SSB IE 900 may be utilized for configuring NCD-SSBs with offsets greater than 15 ms. For example, a base station (such as the base station 108 (FIG. 1) and/or the gNB 1400 (FIG. 14)) may transmit the NCD-SSB IE 800 to a UE (such as the UE 104 (FIG. 1) and/or the UE 1300 (FIG. 13)) to configure the UE for offsets for NCD-SSBs greater than 15 ms. The base station may transmit the NCD-SSB IE 900 in a configuration message to the UE.

The NCD-SSB IE 900 may include a periodicity field 902. The periodicity field 902 may be utilized for defining a periodicity for NCD-SSB. The periodicity field 902 may provide one or more values that can be selected for the periodicity for NCD-SSB. In the illustrated embodiment, the periodicity field 902 can allow selection of periodicities of 5 ms, 10 ms, 20 ms, 40 ms, 80 ms, and 160 ms. The NCD-SSB IE 900 may be transmitted with one of the values in the periodicity field 902 for defining the periodicity of the NCD-SSB.

The NCD-SSB IE 900 may include a first time offset field 904. The first time offset field 904 may be utilized for defining an offset for NCD-SSB for UEs that do not support offsets greater than 15 ms. For example, the first time offset field 904 may allow the NCD-SSB IE 900 to be backward compatible with UEs that support legacy approaches for configuring the offset for NCD-SSB. The first time offset field 904 may allow selection for offsets of 5 ms, 10 ms, and 15 ms. The NCD-SSB IE 900 may be transmitted with one of the values in the first time offset field 904 for defining the offset for the NCD-SSB. In embodiments where the NCD-SSB IE 900 is being transmitted to UEs that support offsets greater than 15 ms, the first time offset field 904 may be omitted from the NCD-SSB IE 900.

The NCD-SSB IE 900 may include a second time offset field 906. The second time offset field 906 may be utilized for defining an offset for NCD-SSB for UEs that support offsets greater than 15 ms. The second time offset field 906 may allow selection for offsets of 5 ms, 10 ms, 15 ms, 20 ms, 25 ms, 30 ms, 35 ms, 40 ms, 45 ms, 50 ms, 55 ms, 60 ms, 65 ms, 70 ms, 75 ms, 80 ms, 85 ms, 90 ms, 95 ms, 100 ms, 105 ms, 110 ms, 115 ms, 120 ms, 125 ms, 130 ms, 135 ms, 140 ms, 145 ms, 150 ms, and 155 seconds. The NCD-SSB IE 900 may be transmitted with one of the values in the second time offset field 906 for defining the offset for the NCD-SSB. In embodiments where the NCD-SSB IE 900 is being transmitted to UEs that does not support offsets greater than 15 ms, the second time offset field 906 may be omitted from the NCD-SSB IE 900.

For the NCD-SSB IE 900, the UE may apply the offset relative to the CD-SSB transmission from SFN 0. For example, the UE may identify the CD-SSB transmission associated with an SFN value of 0. The UE may apply the offset indicated in the first time offset field 904 and/or the second time offset field 906 to the CD-SSB transmission associated with the SFN value of 0 to determine when the NCD-SSB is to be received.

Figure 10:
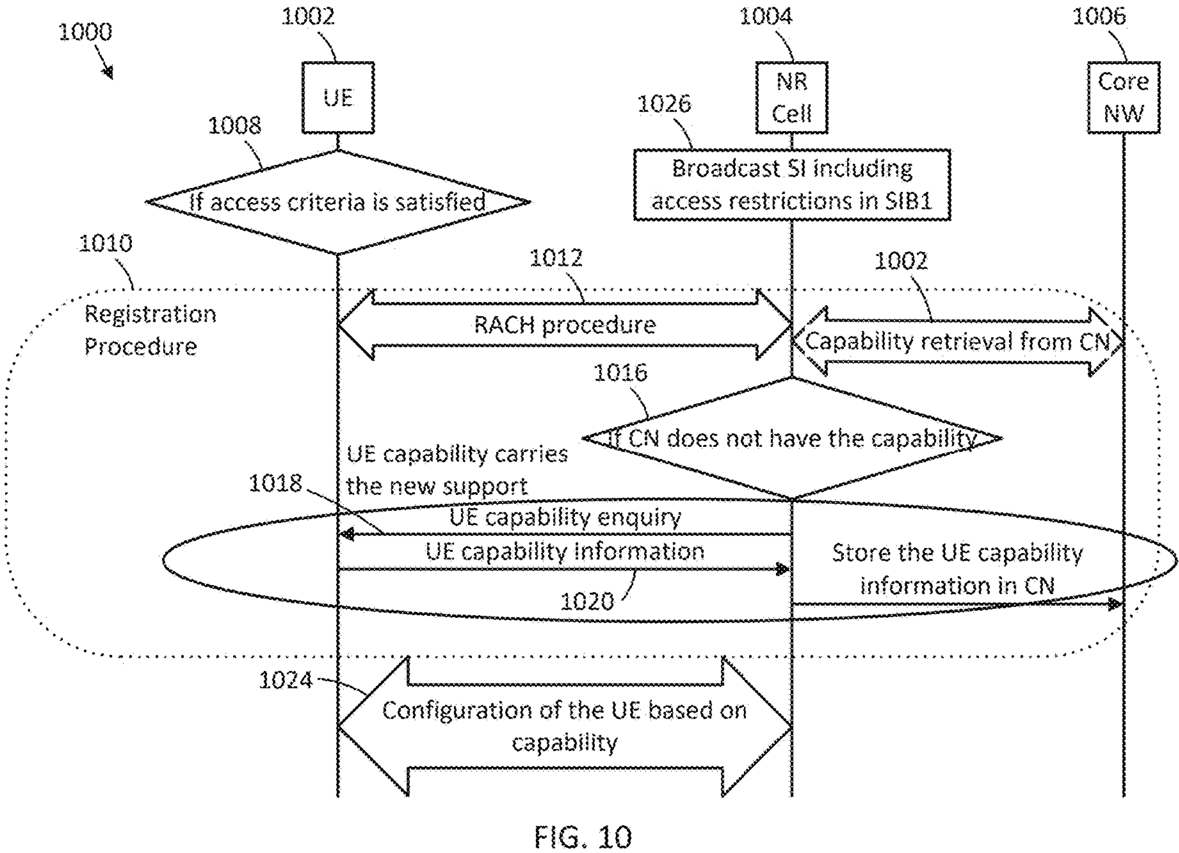
FIG. 10 illustrates a signaling diagram in accordance with some embodiments.

FIG. 10 illustrates a signaling diagram 1000 in accordance with some embodiments. In particular, the signaling diagram 1000 illustrates example signals and/or operations that can be transmitted and/or performed within a network for configuring offsets for an NCD-SSB in accordance with approaches described through this disclosure. In the signaling diagram 1000, the UE may indicate support for the configuration of an NCD-SSB offset for all legal CD-SSB configurations. The network may only configure the UE with the new offset configuration if the UE indicates that it supports it.

The signaling diagram 1000 may include a UE 1002. The UE 1002 may include one or more of the features of the UE 104 (FIG. 1) and/or the UE 1300 (FIG. 13). The UE 1002 may be a RedCap UE. Accordingly, the UE 1002 may have reduced capabilities, such as operating in a 20 MHz BW.

The signaling diagram 1000 may include a base station 1004. The base station 1004 may include one or more of the features of the base station 108 (FIG. 1) and/or the gNB 1400 (FIG. 14). The base station 1004 may operate a cell, where the cell may be a new radio (NR) cell.

The signaling diagram 1000 may include a core network (CN) 1006. The CN 1006 may comprise one or more hardware elements and/or one or more software elements that can provide connectivity to the Internet and/or to one or more application servers.

The base station 1004 may broadcasts system information (SI) to one or more UEs in 1026, such as the UE 1002. The SI may include access restrictions in a system information block 1 (SIB1). The access restrictions may be utilized for determining which UEs can gain access to the network via the base station 1004.

The UE 1002 may receive the SI transmitted by the base station 1004. The UE 1002 may determine if the access criteria is satisfied in 1008. If the UE 1002 determines that the access criteria for the base station 1004 is satisfied, the UE 1002 may initiate a registration procedure 1010.

The registration procedure 1010 may include performing a random access channel (RACH) procedure 1012 between the UE 1002 and the base station 1004. The RACH procedure 1012 may result in establishment of a RACH connection between the UE 1002 and the base station 1004.

Based on the RACH procedure 1012, the base station 1004 may query the CN 1006 to determine whether the CN 1006 has information indicating whether the UE 1002 supports NCD-SSB IEs described herein that include NCD-SSB offsets greater than 15 ms (referred to as "extended NCD-SSB IEs" for clarity). If the CN 1006 has information on whether the UE 1002 supports extended NCD-SSB IEs, the CN 1006 may respond with an indication whether the UE 1002 supports extended NCD-SSB IEs. If the CN 1006 does not have information on whether the UE 1002 supports extended NCD-SSB IEs, the CN 1006 may respond with an indication that the CN 1006 does not have information on whether the UE 1002 supports extended NCD-SSB IEs.

The base station 1004 may receive the indication from the CN 1006 that indicates whether the UE 1002 supports extended NCD-SSB IEs or that the CN 1006 does not have information on whether the UE 1002 supports extended NCD-SSB IEs. The base station 1004 may determine whether the CN 1006 has information about whether the UE 1002 supports extended NCD-SSB IEs in 1016. If the indication from the CN 1006 indicates whether the UE 1002 supports extended NCD-SSB IEs, the registration procedure 1010 may be completed and the flow proceeds to 1024. If the indication from the CN 1006 indicates that the CN 1006 does not have information on whether the UE 1002 supports extended NCD-SSB IEs, the registration procedure 1010 proceeds.

In the instances where the registration procedure 1010 continues after 1016, the base station 1004 may transmit a UE capability enquiry 1018 to the UE 1002. The UE capability enquiry 1018 may enquire whether the UE 1002 supports extended NCD-SSB IEs.

The UE 1002 may receive the UE capability enquiry 1018 from the base station 1004. The UE 1002 may transmit UE capability information 1020 to the base station 1004 based on the UE capability enquiry 1018. The UE capability information may indicate whether the UE 1002 supports extended NCD-SSB IEs.

The base station 1004 may receive the UE capability information from the UE 1002. The base station 1004 may determine whether the UE 1002 supports extended NCD-SSB IEs based on the UE capability information. The base station 1004 may further transmit the UE capability information, or an indication of whether the UE 1002 supports extended NCD-SSB IEs, to the CN 1006. The CN 1006 may store the UE capability and/or an indication of whether the UE 1002 supports extended NCD-SSB IEs for future use. The registration procedure 1010 may be completed after the UE capability information, or the indication, are transmitted to the CN 1006.

A configuration procedure 1024 may be performed to configure the UE 1002 and the base station 1004 based on the UE capability of the UE 1002. For example, the UE 1002 and the base station 1004 may be configured based on whether the UE 1002 supports extended NCD-SSB IEs.

The base station 1004 may transmit a configuration message with an NCD-SSB IE (such as the NCD-SSB IE 800 (FIG. 8) and/or the NCD-SSB IE 900 (FIG. 9)) to the UE 1002 as part of the configuration procedure 1024 to configure the UE 1002 for reception of NCD-SSBs. In instances where the UE 1002 does not support extended NCD-SSB IEs, the NCD-SSB IE transmitted by the base station 1004 may include a time offset field that is backwards compatible, such as the first time offset field 804 (FIG. 8) and/or the first time offset field 904 (FIG. 9)). In instances where the UE 1002 supports extended NCD-SSB IEs, the NCD-SSB IE transmitted by the base station 1004 may include a time offset field that can indicate time offsets greater than 15 ms, such as the second time offset field 806 (FIG. 8) and/or the second time offset field 906 (FIG. 9). The UE 1002 may determine when NCD-SSBs are to be received, and the base station 1004 may transmit NCD-SSBs, based on the information provided in the NCD-SSB IE. For example, the UE 1002 may utilize one or more of the approaches described throughout this disclosure to determine when NCD-SSBs are to be received based on the periodicity and/or offset indicated in the NCD-SSB IE.

The base station 1004 may further provide an SSB IE (such as the SSB IE 200 (FIG. 2)) to the UE 1002 as part of the configuration procedure 1024. The base station 1004 may provide the SSB IE in the same configuration message as the NCD-SSB IE or in a different configuration message from the NCD-SSB IE. The UE 1002 may determine the periodicity and/or the offset for CD-SSBs based on the SSB IE. Further, the base station 1004 may transmit the CD-SSBs in accordance with the periodicity and offset indicated in the SSB IE.

FIG. 11 illustrates a UE capability IE 1100 in accordance with some embodiments. The UE capability IE 1100 may be utilized to indicate whether a UE supports extended NCD-SSB IEs. For example, a UE (such as the UE 104 (FIG. 1) and/or the UE 1300 (FIG. 13)) may transmit the UE capability IE 1100 to a base station (such as the base station 108 (FIG. 1) and/or the gNB 1400 (FIG. 14)) to indicate whether the UE supports extended NCD-SSB IEs. The UE may transmit the UE capability IE 1100 as part of UE capability information, such as the UE capability information 1020 (FIG. 1).

The UE capability IE 1100 may include a RedCap long offset support field 1102. The RedCap long offset support field 1102 may indicate whether the UE supports extended NCD-SSB IEs. In some embodiments, the RedCap long offset support field 1102 may be set to a first value to indicate that the UE supports extended NCD-SSB IEs and may be set to a second value to indicate that the UE does not support extended NCD-SSB IEs. In other embodiments, the RedCap long offset support field 1102 may be included in the UE capability IE 1100 to indicate that the UE supports extended NCD-SSB IEs and may be omitted from the UE capability IE 1100 to indicate that the UE does not support extended NCD-SSB IEs.

The UE may indicate that it supports the configuration of NCD-SSB offset for all legal CD-SSB configurations. For example, the UE may utilize the UE capability IE 1100 to indicate if the UE supports extended NCD-SSBs, which provide for NCD-SSB offsets for all legal CD-SSB configurations. The network (NW) may only configure the UE with the new offset configuration if the UE indicates support of this. If the UE does not support this, and the NW does, the NCD_SSB configured to the UE would be within the 3 half-frames of CD-SSB, or there would be no offset in time domain. For example, if a UE indicates that it does not support extended NCD-SSBs, even if the NW supports extended NCD-SSBs the NW may utilize an NCD-SSB to configure the UE with no offset, an offset of 5 ms, an offset of 10 ms, or an offset of 15 ms.

Figure 12:
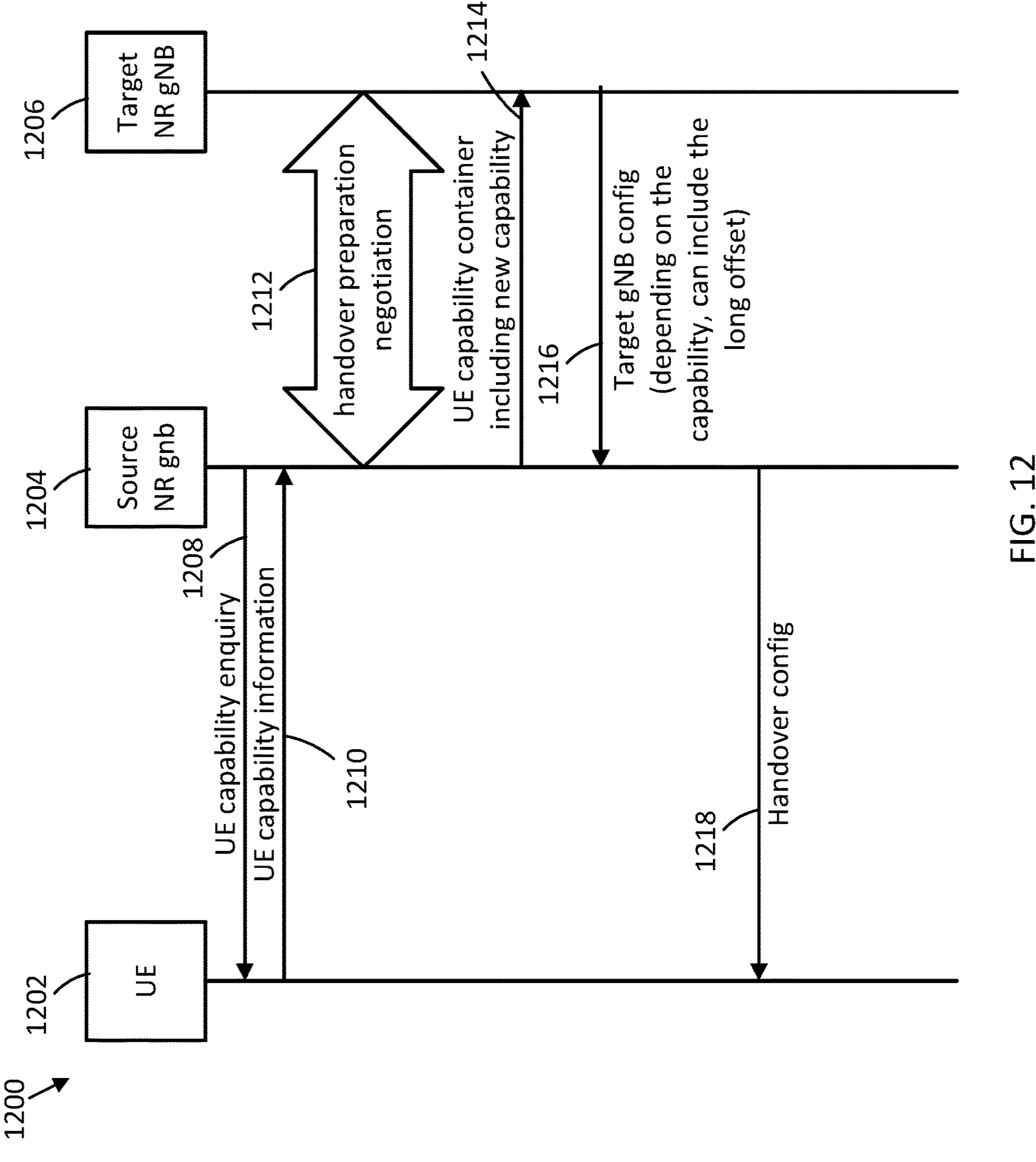
FIG. 12 illustrates a signaling diagram in accordance with some embodiments.

FIG. 12 illustrates a signaling diagram 1200 in accordance with some embodiments. The signaling diagram 1200 may illustrate concepts related to UE capability on handling the new offset across various base stations. For example, the signaling diagram 1200 illustrates example signals and/or operations that can be transmitted and/or performed as part of a handover to indicate whether extended NCD-SSB IEs are supported.

The network nodes (for example, a source base station and a target base station) may exchange this capability and ensure that all the UEs that support the new offset are configured for its use. If a RedCap UE that does not support the long offset feature is handed over to a target base station, the UE may assume that the target base station understands that the UE does not support the long offset feature, and the long offset configuration may not be configured to the UE.

The signaling diagram 1200 may include a UE 1202. The UE 1202 may include one or more of the features of the UE 104 (FIG. 1) and/or the UE 1300 (FIG. 13). The UE 1202 may be a RedCap UE. Accordingly, the UE 1202 may have reduced capabilities, such as operating in a 20 MHz BW.

The signaling diagram 1200 may include a source base station 1204. The source base station 1204 may include one or more of the features of the base station 108 (FIG. 1) and/or the gNB 1400 (FIG. 14). The UE 1202 may have a connection established with the source base station 1204 at the initiation of the signaling diagram 1200.

The signaling diagram 1200 may include a target base station 1206. The target base station 1206 may include one or more of the features of the base station 108 and/or the gNB 1400. The handover may be to transition a connection of the UE 1202 with the source base station 1204 to a connection between the UE 1202 and the target base station 1206.

The source base station 1204 may transmit a UE capability enquiry 1208 to the UE 1202. The UE capability enquiry 1208 may enquire whether the UE 1202 supports extended NCD-SSB IEs.

The UE 1202 may receive the UE capability enquiry 1208. The UE 1202 may transmit UE capability information 1210 to the source base station 1204 to indicate whether the UE 1202 supports extended NCD-SSB IEs. The UE capability information 1210 may include a UE capability IE (such as the UE capability IE 1100 (FIG. 11)) that indicates whether the UE 1202 supports extended NCD-SSB IEs.

The source base station 1204 may perform handover preparation negotiation 1212 with the target base station 1206. The handover preparation negotiation 1212 may prepare the target base station 1206 for handover of the connection with the UE 1202.

The source base station 1204 may transmit a UE capability container message 1214 to the target base station 1206. The UE capability container message 1214 may indicate capabilities of the UE 1202. For example, the UE capability container message 1214 may indicate whether the UE 1202 supports extended NCD-SSB IEs.

The target base station 1206 may identify the UE capability container message 1214 received from the source base station 1204. The target base station 1206 may determine whether the UE 1202 supports extended NCD-SSB IEs based on the UE capability container message 1214. The target base station 1206 may transmit a target base station configuration message 1216 to the source base station 1204. In instances where the target base station 1206 determines that the UE 1202 supports NCD-SSB IEs, the target base station configuration message 1216 may include an extended NCD-SSB IE that indicates an offset and/or periodicity for NCD-SSBs provided by the target base station 1206 and/or may indicate an offset of greater than 15 ms and/or periodicity for NCD-SSBs provided by the target base station 1206.

The source base station 1204 may identify the target base station configuration message 1216 received from the target base station 1206. In the instance that the target base station configuration message 1216 includes the extended NCD-SSB IE, and/or the indication of the offset and/or periodicity, the source base station 1204 may identify the extended NCD-SSB IE, and/or the offset and/or periodicity.

The source base station 1204 may transmit a handover configuration message 1218 to the UE 1202. The handover configuration message 1218 may configure the UE 1202 for handover to the target base station 1206. In instances where the source base station 1204 identified the extended NCD-SSB IE, and/or the offset and/or periodicity, with in the target base station configuration message 1216, the handover configuration message 1218 may include an extended NCD-SSB IE that indicates the offset and/or periodicity for NCD-SSBs provided by the target base station 1206.

The UE 1202 may identify the handover configuration message 1218 received from the source base station 1204. The UE 1202 may identify the extended NCD-SSB IE in the handover configuration message 1218. The UE 1202 may determine the offset and/or periodicity for NCD-SSBs to be provided by the target base station 1206. Based on the offset and/or periodicity, the UE 1202 may determine when NCD-SSBs are to be transmitted by the target base station 1206. Accordingly, the UE 1202 may be configured for the NCD-SSBs to be transmitted by the target base station 1206 when the connection of the UE is transferred to the target base station 1206. The configuration of the UE 1202 for the NCD-SSBs prior to the handover to the target base station 1206 may allow for quicker synchronization of the UE 1202 with the target base station 1206 than if the configuration is performed after the handover.

FIG. 13 illustrates an example UE 1300 in accordance with some embodiments. The UE 1300 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the UE 1300 may be a RedCap UE or NR-Light UE.

The UE 1300 may include processors 1304, RF interface circuitry 1308, memory/storage 1312, user interface 1316, sensors 1320, driver circuitry 1322, power management integrated circuit (PMIC) 1324, antenna structure 1326, and battery 1328. The components of the UE 1300 may be implemented as integrated circuits (ICs), portions thereof, discrete electronic devices, or other modules, logic, hardware, software, firmware, or a combination thereof. The block diagram of FIG. 13 is intended to show a high-level view of some of the components of the UE 1300. However, some of the components shown may be omitted, additional components may be present, and different arrangement of the components shown may occur in other implementations.

The components of the UE 1300 may be coupled with various other components over one or more interconnects 1332, which may represent any type of interface, input/output, bus (local, system, or expansion), transmission line, trace, optical connection, etc. that allows various circuit components (on common or different chips or chipsets) to interact with one another.

The processors 1304 may include processor circuitry such as, for example, baseband processor circuitry (BB) 1304A, central processor unit circuitry (CPU) 1304B, and graphics processor unit circuitry (GPU) 1304C. The processors 1304 may include any type of circuitry or processor circuitry that executes or otherwise operates computer-executable instructions, such as program code, software modules, or functional processes from memory/storage 1312 to cause the UE 1300 to perform operations as described herein.

In some embodiments, the baseband processor circuitry 1304A may access a communication protocol stack 1336 in the memory/storage 1312 to communicate over a 3GPP compatible network. In general, the baseband processor circuitry 1304A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1308.

The baseband processor circuitry 1304A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1312 may include one or more non-transitory, computer-readable media that includes instructions (for example, communication protocol stack 1336) that may be executed by one or more of the processors 1304 to cause the UE 1300 to perform various operations described herein. The memory/storage 1312 include any type of volatile or non-volatile memory that may be distributed throughout the UE 1300. In some embodiments, some of the memory/storage 1312 may be located on the processors 1304 themselves (for example, L1 and L2 cache), while other memory/storage 1312 is external to the processors 1304 but accessible thereto via a memory interface. The memory/storage 1312 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 1308 may include transceiver circuitry and radio frequency front module (RFEM) that allows the UE 1300 to communicate with other devices over a radio access network. The RF interface circuitry 1308 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1326 and proceed to filter and amplify (with a low-noise amplifier) the signal. The signal may be provided to a receiver of the transceiver that down-converts the RF signal into a baseband signal that is provided to the baseband processor of the processors 1304.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1326.

In various embodiments, the RF interface circuitry 1308 may be configured to transmit/receive signals in a manner compatible with NR access technologies.

The antenna 1326 may include antenna elements to convert electrical signals into radio waves to travel through the air and to convert received radio waves into electrical signals. The antenna elements may be arranged into one or more antenna panels. The antenna 1326 may have antenna panels that are omnidirectional, directional, or a combination thereof to enable beamforming and multiple input, multiple output communications. The antenna 1326 may include microstrip antennas, printed antennas fabricated on the surface of one or more printed circuit boards, patch antennas, phased array antennas, etc. The antenna 1326 may have one or more panels designed for specific frequency bands including bands in FR1 or FR2.

The user interface circuitry 1316 includes various input/output (I/O) devices designed to enable user interaction with the UE 1300. The user interface 1316 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1300.

The sensors 1320 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1322 may include software and hardware elements that operate to control particular devices that are embedded in the UE 1300, attached to the UE 1300, or otherwise communicatively coupled with the UE 1300. The driver circuitry 1322 may include individual drivers allowing other components to interact with or control various input/output (I/O) devices that may be present within, or connected to, the UE 1300. For example, driver circuitry 1322 may include a display driver to control and allow access to a display device, a touchscreen driver to control and allow access to a touchscreen interface, sensor drivers to obtain sensor readings of sensor circuitry 1320 and control and allow access to sensor circuitry 1320, drivers to obtain actuator positions of electro-mechanic components or control and allow access to the electro-mechanic components, a camera driver to control and allow access to an embedded image capture device, audio drivers to control and allow access to one or more audio devices.

The PMIC 1324 may manage power provided to various components of the UE 1300. In particular, with respect to the processors 1304, the PMIC 1324 may control power-source selection, voltage scaling, battery charging, or DC-to-DC conversion.

In some embodiments, the PMIC 1324 may control, or otherwise be part of, various power saving mechanisms of the UE 1300. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1300 may power down for brief intervals of time and thus save power. If there is no data traffic activity for an extended period of time, then the UE 1300 may transition off to an RRC_Idle state, where it disconnects from the network and does not perform operations such as channel quality feedback, handover, etc. The UE 1300 goes into a very low power state and it performs paging where again it periodically wakes up to listen to the network and then powers down again. The UE 1300 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1328 may power the UE 1300, although in some examples the UE 1300 may be mounted deployed in a fixed location, and may have a power supply coupled to an electrical grid. The battery 1328 may be a lithium ion battery, a metal-air battery, such as a zinc-air battery, an aluminum-air battery, a lithium-air battery, and the like. In some implementations, such as in vehicle-based applications, the battery 1328 may be a typical lead-acid automotive battery.

FIG. 14 illustrates an example gNB 1400 in accordance with some embodiments. The gNB 1400 may include processors 1404, RF interface circuitry 1408, core network (CN) interface circuitry 1412, memory/storage circuitry 1416, and antenna structure 1426.

The components of the gNB 1400 may be coupled with various other components over one or more interconnects 1428.

The processors 1404, RF interface circuitry 1408, memory/storage circuitry 1416 (including communication protocol stack 1410), antenna structure 1426, and interconnects 1428 may be similar to like-named elements shown and described with respect to FIG. 13.

The CN interface circuitry 1412 may provide connectivity to a core network, for example, a 5th Generation Core network (5GC) using a 5GC-compatible network interface protocol such as carrier Ethernet protocols, or some other suitable protocol. Network connectivity may be provided to/from the gNB 1400 via a fiber optic or wireless backhaul. The CN interface circuitry 1412 may include one or more dedicated processors or FPGAs to communicate using one or more of the aforementioned protocols. In some implementations, the CN interface circuitry 1412 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include a method of operating a user equipment (UE), the method comprising receiving, from a base station, a configuration message that provides an offset value to define an offset between a reference synchronization signal and physical broadcast channel block (SSB) and a non-cell defining (NCD)-SSB, determining a period in which the NCD-SSB is to be transmitted based on the offset value, and receiving the NCD-SSB within the period.

Example 2 may include the method of example 1, wherein the offset value is larger than 15 milliseconds (ms).

Example 3 may include the method of example 1, wherein the reference SSB comprises a cell-defining (CD) SSB with a system frame number (SFN) equal to zero.

Example 4 may include the method of example 1, wherein the reference SSB has a periodicity of 40 milliseconds (ms) and the offset value is within a range of 5 ms to 35 ms, the reference SSB has a periodicity of 80 milliseconds (ms) and the offset value is within a range of 5 ms to 75 ms, or the reference SSB has a periodicity of 160 milliseconds (ms) and the offset value is within a range of 5 ms to 155 ms.

Example 5 may include the method of example 1, wherein determining the period comprises determining, based on configuration information associated with the reference SSB, a window having an assumed start of the reference SSB, and applying the offset value to a first SSB in the window.

Example 6 may include the method of example 5, wherein determining the window comprises determining a start of the window based on explicit signaling of a system frame number or slot value, or determining a start of the window based on a cell defining (CD)-SSB with a system frame number or slot value equal to zero.

Example 7 may include the method of example 5, wherein determining the window comprises determining a first periodicity associated with the reference SSB, determining a second periodicity associated with the NCD-SSB, and determining a length of the window is equal to whichever value of the first periodicity or the second periodicity is larger.

Example 8 may include the method of example 1, further comprising transmitting, to a network, an indication that the UE supports configuration of an NCD-SSB offset for CD-SSB configurations.

Example 9 may include the method of example 1, wherein the UE is a reduced capability UE.

Example 10 may include a method of operating a base station, the method comprising determining an offset value to define an offset between a cell defining synchronization signal and physical broadcast channel block (CD-SSB) and a non-cell defining synchronization signal and physical broadcast channel block (NCD-SSB), the offset value larger than 15 milliseconds (ms), transmitting a configuration message that indicates the offset value, and transmitting the NCD-SSB within a period defined by the offset value.

Example 11 may include the method of example 10, wherein the CD-SSB comprises a CD-SSB with a system frame number (SFN) equal to zero, and wherein the method further comprises determining the period for transmitting the NCD-SSB based on the CD-SSB with the SFN equal to zero and the offset value.

Example 12 may include the method of example 10, wherein a periodicity of the CD-SSB is 40 ms and the offset value is less than or equal to 35 ms, a periodicity of the CD-SSB is 80 ms and the offset value is less than or equal to 75 ms, or a periodicity of the CD-SSB is 160 ms and the offset value is less than or equal to 155 ms.

Example 13 may include the method of example 12, wherein the configuration message indicates the periodicity of the CD-SSB.

Example 14 may include the method of example 10, further comprising performing a random access channel (RACH) procedure to connect with a user equipment (UE), and determining that the UE supports configuration of the offset between the CD-SSB and the NCD-SSB, wherein base station transmits the configuration message that indicates the offset value to the UE based on the determination that the UE supports the offset between the CD-SSB and the NCD-SSB.

Example 15 may include the method of example 14, wherein determining that the UE supports configuration of the offset between the CD-SSB and the NCD-SSB comprises receiving UE capability information from a core network that indicates that the UE supports configuration of the offset between the CD-SSB and the NCD-SSB.

Example 16 may include the method of example 10, wherein the base station transmits the configuration message to a user equipment (UE), and wherein the UE is a reduced capability UE.

Example 17 may include a method of operating a user equipment (UE), the method comprising receiving a configuration message that provides an offset value for a non-cell defining synchronization signal and physical broadcast channel block (NCD-SSB), receiving a cell defining synchronization signal and physical broadcast channel block (CD-SSB) with a system frame number (SFN) equal to zero, determining a period for reception of the NCD-SSB based on the CD-SSB and the offset value for the NCD-SSB, and receiving the NCD-SSB within the period.

Example 18 may include the method of example 17, wherein the offset value is greater than 15 milliseconds (ms).

Example 19 may include the method of example 17, wherein the CD-SSB has a periodicity of 40 milliseconds (ms) and the offset value is within a range of 5 ms to 35 ms, the CD-SSB has a periodicity of 80 milliseconds (ms) and the offset value is within a range of 5 ms to 75 ms, or the CD-SSB has a periodicity of 160 milliseconds (ms) and the offset value is within a range of 5 ms to 155 ms.

Example 20 may include the method of example 17, wherein the UE is a reduced capability UE.

Example 21 includes a method of operating a user equipment (UE), the method comprising: receiving, from a base station, a configuration message that provides: an offset value to define an offset between a reference synchronization signal and physical broadcast channel block (SSB) and a non-cell defining (NCD) SSB; and configuration information associated with the reference SSB; determining a period in which the NCD SSB is to be transmitted based on the offset value and the configuration information associated with the reference SSB; and receiving the NCD SSB within the period.

Example 22 includes the method of example 21 or some other example herein, wherein: the configuration information indicates the reference SSB has a periodicity of 40 milliseconds (ms) and the offset value is within a range of 5 ms to 35 ms; the configuration information indicates the reference SSB has a periodicity of 80 milliseconds (ms) and the offset value is within a range of 5 ms to 75 ms; or the configuration information indicates the reference SSB has a periodicity of 160 milliseconds (ms) and the offset value is within a range of 5 ms to 155 ms.

Example 23 includes a method of example 21 or some other example herein, wherein determining the period comprises: determining, based on the configuration information, a window having an assumed start of the reference SSB; and applying the offset value to a first SSB in the window.

Example 24 includes the method of example 23 or some other example herein, wherein determining the window comprises: determining a start of the window based on explicit signaling of a system frame number or slot value; or determining a start of the window based on a cell defining (CD)-SSB with a system frame number or slot value equal to zero.

Example 25 includes the method of example 23 or some other example herein, wherein determining the window comprises: determining a first periodicity associated with the reference SSB; determining a second periodicity associated with the NCD-SSB; determining a length of the window is equal to whichever value of the first periodicity or the second periodicity is larger.

Example 26 includes a method of example 21 or some other example herein, further comprising: transmitting, to a network, an indication that the UE supports configuration of an NCD-SSB offset for CD-SSB configurations.

Example 27 includes the method of example 21 or some other example herein, wherein the UE is a reduced capability UE.

Example 28 includes a method of operating a base station, the method comprising: performing a random access channel (RACH) procedure to connect with a user equipment; and determining whether the UE supports configuration of a non-cell defining (NCD)-synchronization signal and physical broadcast channel block (SSB) offset for cell-defining (CD)-SSB configurations.

Example 29 includes the method of example 28 or some other example herein, wherein determining whether the UE supports configuration of NCD-SSB offset for CD-SSB configurations comprises: receiving UE capability information from a core network; and determining that the UE supports configuration of NCD-SSB offset for CD-SSB configurations based on the UE capability information.

Example 30 includes a method of example 28 or some other example herein, wherein determining whether the UE supports configuration of NCD-SSB offset for CD-SSB configurations comprises: receiving first UE capability information from a core network; determining the first UE capability information does not have NCD-SSB offset information; receiving second UE capability information from the UE; and determining that the UE supports configuration of NCD-SSB offset for CD-SSB configurations based on the second UE capability information.

Example 31 includes the method of example 28 or some other example herein, wherein determining whether the UE supports configuration of NCD-SSB offset for CD-SSB configurations comprises determining that the UE supports configuration of NCD-SSB offset for CD-SSB configurations and the method further comprises: transmitting a configuration message to the UE, the configuration message to include: an offset value to define an offset between a reference SSB and an NCD-SSB; and configuration information associated with the reference SSB.

Example 32 includes the method of example 28 or some other example herein, wherein the UE is a reduced capability UE.

Example 33 includes a method of operating a target base station, the method comprising: receiving, from a source base station, information associated with a handover of a connection with a user equipment (UE); receiving, from the source base station, a UE capability container that indicates whether the UE supports configuration of a non-cell defining (NCD)-synchronization signal and physical broadcast channel block (SSB) offset for cell-defining (CD)-SSB configurations; and configuring the UE based on the UE capability container.

Example 34 includes the method of example 33 or some other example herein, wherein the UE capability container is to indicate that the UE supports configuration of an NCD-SSB offset for CD-SSB configurations and configuring the UE further comprises: transmitting a configuration message to the UE, the configuration message to include: an offset value to define an offset between a reference SSB and an NCD-SSB; and configuration information associated with the reference SSB.

Example 35 includes the method of example 33 or some other example herein, wherein the UE is a reduced capability UE.

Example 36 may include an apparatus comprising means to perform one or more elements of a method described in or related to any of examples 1-35, or any other method or process described herein.

Example 37 may include one or more non-transitory computer-readable media comprising instructions to cause an electronic device, upon execution of the instructions by one or more processors of the electronic device, to perform one or more elements of a method described in or related to any of examples 1-35, or any other method or process described herein.

Example 38 may include an apparatus comprising logic, modules, or circuitry to perform one or more elements of a method described in or related to any of examples 1-35, or any other method or process described herein.

Example 39 may include a method, technique, or process as described in or related to any of examples 1-35, or portions or parts thereof.

Example 40 may include an apparatus comprising: one or more processors and one or more computer-readable media comprising instructions that, when executed by the one or more processors, cause the one or more processors to perform the method, techniques, or process as described in or related to any of examples 1-35, or portions thereof.

Example 41 may include a signal as described in or related to any of examples 1-35, or portions or parts thereof.

Example 42 may include a datagram, information element, packet, frame, segment, PDU, or message as described in or related to any of examples 1-35, or portions or parts thereof, or otherwise described in the present disclosure.

Example 43 may include a signal encoded with data as described in or related to any of examples 1-35, or portions or parts thereof, or otherwise described in the present disclosure.

Example 44 may include a signal encoded with a datagram, IE, packet, frame, segment, PDU, or message as described in or related to any of examples 1-35, or portions or parts thereof, or otherwise described in the present disclosure.

Example 45 may include an electromagnetic signal carrying computer-readable instructions, wherein execution of the computer-readable instructions by one or more processors is to cause the one or more processors to perform the method, techniques, or process as described in or related to any of examples 1-35, or portions thereof.

Example 46 may include a computer program comprising instructions, wherein execution of the program by a processing element is to cause the processing element to carry out the method, techniques, or process as described in or related to any of examples 1-35, or portions thereof.

Example 47 may include a signal in a wireless network as shown and described herein.

Example 48 may include a method of communicating in a wireless network as shown and described herein.

Example 49 may include a system for providing wireless communication as shown and described herein.

Example 50 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:

receiving, from a base station, a message that provides a time offset between a synchronization signal physical broadcast channel block (SSB) and a non-cell defining (NCD)-SSB, the time offset being 40 milliseconds (ms) or 80 ms, the time offset being less than a periodicity of the SSB;

receiving the SSB; and receiving the NCD-SSB at a first time after the SSB is received, the first time based at least in part on the time offset.

2. The method of claim 1, wherein the SSB comprises a cell-defining (CD) SSB with a system frame number (SFN) equal to zero.

3. The method of claim 1, wherein:

the SSB has a periodicity of 80 milliseconds (ms) and the time offset is 40 ms; or the reference SSB has a periodicity of 160 milliseconds (ms).

4. The method of claim 1, further comprising:

determining, based on configuration information associated with the SSB, a window having an assumed start of the SSB, wherein the SSB is received within the window; and applying the time offset to the SSB to define the first time based at least in part on the SSB being received within the window.

5. The method of claim 4, wherein determining the window comprises:

determining a start of the window based on explicit signaling of a system frame number or slot value; or determining a start of the window based on a cell defining (CD)-SSB with a system frame number or slot value equal to zero.

6. The method of claim 4, wherein determining the window comprises:

determining a first periodicity associated with the SSB;

determining a second periodicity associated with the NCD-SSB; and determining a length of the window is equal to whichever value of the first periodicity or the second periodicity is larger.

7. The method of claim 1 further comprising:

generating, for transmission to a network, an indication that a user equipment (UE) supports configuration of an NCD-SSB offset for CD-SSB configurations.

8. The method of claim 1, wherein the method is performed by a processor of a reduced capability user equipment (UE).

9. The method of claim 1, wherein the SSB is a first SSB, wherein the message includes an indication of a system frame number from which a window for receiving the SSB is to be started, and wherein the method further comprises:

identifying the window based at least in part on the system frame number, wherein the first SSB is received during the window;

identifying a second SSB received during the window, the second SSB being received after the first SSB; and determining that another NCD-SSB is not to be received at a second time after the SSB is received based at least in part on the second SSB being received after the first SSB during the window, the second time being the time offset after the second SSB.

10. The method of claim 1, wherein the message includes an indication of a system frame number and a slot value from which a window for receiving the SSB is to be started, and wherein the method further comprises:

identifying the window based at least in part on the system frame number and the slot value, wherein the SSB is received during the window.

11. A method comprising:

generating, for transmission, a message that indicates a time offset between a synchronization signal physical broadcast channel block (SSB) and a non-cell defining (NCD)-SSB, the time offset being 40 milliseconds (ms) or 80 ms, the time offset being less than a periodicity of the SSB; and generating, for transmission, the NCD-SSB at a first time after the SSB is transmitted, the first time based at least in part on the time offset.

12. The method of claim 11, wherein the SSB comprises a CD-SSB with a system frame number (SFN) equal to zero, and wherein the method further comprises:

determining the first time for transmitting the NCD-SSB based on the SSB with the SFN equal to zero and the time offset.

13. The method of claim 11, wherein:

the periodicity of the SSB is 80 ms and the time offset is 40 ms; or the periodicity of the SSB is 160 ms.

14. The method of claim 13, wherein the message indicates the periodicity of the SSB.

15. The method of claim 11, further comprising:

performing a random access channel (RACH) procedure to connect with a user equipment (UE); and determining that the UE supports configuration of the time offset between the SSB and the NCD-SSB, wherein the message is generated based at least in part on the determination that the UE supports the time offset between the SSB and the NCD-SSB.

16. The method of claim 15, wherein determining that the UE supports configuration of the time offset between the SSB and the NCD-SSB comprises:

receiving UE capability information from a core network that indicates that the UE supports configuration of the time offset between the SSB and the NCD-SSB.

17. The method of claim 11, wherein the message is transmitted to a user equipment (UE), and wherein the UE is a reduced capability UE.

18. An apparatus comprising:

processing circuitry to:

receive a message that provides a time offset between a synchronization signal physical broadcast channel block (SSB) and a non-cell defining (NCD)-SSB, the time offset being 40 milliseconds (ms) or 80 ms, the time offset being less than a periodicity of the SSB;

receive the SSB; and receive the NCD-SSB at a first time after the SSB is received, the first time based at least in part on the time offset; and interface circuitry coupled to the processing circuitry, the interface circuitry to receive the message.

19. The apparatus of claim 18, wherein:

the SSB has a periodicity of 80 milliseconds (ms) and the time offset is 40 ms; or the SSB has a periodicity of 160 milliseconds (ms).

20. The apparatus of claim 18, wherein the apparatus is part of a reduced capability UE.

* * * * *